(12) United States Patent
Dacko et al.

(10) Patent No.: US 10,947,408 B2
(45) Date of Patent: Mar. 16, 2021

(54) ELECTRODEPOSITABLE COATING COMPOSITION

(71) Applicant: PRC-DeSoto International, Inc., Sylmar, CA (US)

(72) Inventors: Christopher A. Dacko, Pittsburgh, PA (US); Michael A. Mayo, Pittsburgh, PA (US); Gregory J. McCollum, Allison Park, PA (US); Robin M. Peffer, Valencia, PA (US); Se Ryeon Lee, Pittsburgh, PA (US)

(73) Assignee: PRC-DeSoto International, Inc., Sylmar, CA (US)

( * ) Notice: Subject to any disclaimer, the term of this patent is extended or adjusted under 35 U.S.C. 154(b) by 254 days.

(21) Appl. No.: 16/019,590

(22) Filed: Jun. 27, 2018

(65) Prior Publication Data
US 2020/0002566 A1 Jan. 2, 2020

(51) Int. Cl.
| | |
|---|---|
| *C09D 163/00* | (2006.01) |
| *C08K 5/205* | (2006.01) |
| *C08K 5/3492* | (2006.01) |
| *C08K 5/521* | (2006.01) |
| *C08L 63/00* | (2006.01) |
| *B64G 1/22* | (2006.01) |

(52) U.S. Cl.
CPC ........... *C09D 163/00* (2013.01); *B64G 1/226* (2013.01); *C08K 5/205* (2013.01); *C08K 5/3492* (2013.01); *C08K 5/521* (2013.01); *C08L 63/00* (2013.01); *C08L 2201/54* (2013.01)

(58) Field of Classification Search
CPC ....... C08L 63/00; C08L 75/04; C08G 18/246; C08G 71/04; C08K 5/205; C09D 163/00; C09D 175/04
USPC ........................................................ 523/414
See application file for complete search history.

(56) References Cited

U.S. PATENT DOCUMENTS

| | | |
|---|---|---|
| 4,104,100 A | 8/1978 | Anders et al. |
| 4,151,143 A | 4/1979 | Blank et al. |
| 4,397,970 A | 8/1983 | Campbell et al. |
| 4,692,484 A | 9/1987 | Roberts |
| 4,692,503 A | 9/1987 | Das et al. |
| 4,793,867 A | 12/1988 | Charles et al. |
| 4,801,628 A * | 1/1989 | Ashing .............. C08G 59/1422 428/418 |
| 4,812,215 A | 3/1989 | Karabin et al. |
| 4,886,852 A | 12/1989 | Numa |
| 4,957,952 A | 9/1990 | Sekmakas et al. |
| 4,968,399 A | 11/1990 | Tsuchiya et al. |
| 5,384,367 A * | 1/1995 | Swarup ................. B05D 7/534 525/169 |
| 5,389,704 A | 2/1995 | Yabu |
| 5,525,666 A | 6/1996 | Hoenel et al. |
| 5,588,989 A | 12/1996 | Vonk et al. |
| 5,635,049 A | 6/1997 | Mysliwczyk et al. |
| 5,936,026 A | 8/1999 | Huybrechts et al. |
| 6,136,927 A | 10/2000 | Swarup et al. |
| 6,214,188 B1 | 4/2001 | December |
| 6,380,323 B1 | 4/2002 | December |
| 6,509,411 B1 | 1/2003 | Fieberg et al. |
| 6,875,800 B2 | 4/2005 | Vanier et al. |
| 6,894,086 B2 | 5/2005 | Munro et al. |
| 6,984,674 B2 | 1/2006 | Gray et al. |
| 7,671,170 B2 | 3/2010 | Gonzalez et al. |
| 7,749,368 B2 | 7/2010 | McMurdie et al. |
| 8,148,451 B2 | 4/2012 | Fenn et al. |
| 8,153,344 B2 | 4/2012 | Faler et al. |
| 8,323,470 B2 | 12/2012 | Valko et al. |
| 8,354,471 B2 | 1/2013 | Chouai et al. |
| 8,673,091 B2 | 3/2014 | McMillen et al. |
| 9,181,628 B2 | 11/2015 | Valko et al. |
| 9,505,937 B2 | 11/2016 | Hsu et al. |
| 2002/0068176 A1 | 6/2002 | Yokoyama et al. |
| 2003/0127332 A1 | 7/2003 | Bremser et al. |
| 2006/0135651 A1 | 6/2006 | Nakane et al. |
| 2009/0045071 A1 | 2/2009 | Valko et al. |
| 2010/0048836 A1 | 2/2010 | Gonzalez et al. |
| 2012/0121910 A1 | 5/2012 | Colton et al. |
| 2013/0065057 A1 | 3/2013 | Valko et al. |

FOREIGN PATENT DOCUMENTS

| | | |
|---|---|---|
| DE | 19917235 A1 | 10/2000 |
| EP | 0300612 B1 | 10/1993 |
| JP | 06336564 A | 12/1994 |
| JP | 2008169308 A | 7/2008 |
| WO | 0039190 A1 | 7/2000 |
| WO | 0144392 | 6/2001 |
| WO | 0148097 | 7/2001 |
| WO | 03054048 | 7/2003 |

OTHER PUBLICATIONS

Faler, U.S. Appl. No. 10/876,031, filed Jun. 24, 2004, for "Aqueous Dispersions of Microparticles Having a Nanoparticulate Phase and Coating Compositions Containing the Same".

* cited by examiner

*Primary Examiner* — Doris L Lee

(74) *Attorney, Agent, or Firm* — Charles M. Yeomans

(57) ABSTRACT

The present invention is directed to a phosphated epoxy resin comprising at least one terminal group comprising a phosphorous atom covalently bonded to the resin by a carbon-phosphorous bond or by a phosphoester linkage; and at least one carbamate functional group. The present invention is also directed towards aqueous resinous dispersions comprising the phosphated epoxy resin, methods of coating a substrate, coated substrates, and methods of making a phosphated epoxy resin.

29 Claims, No Drawings

ELECTRODEPOSITABLE COATING COMPOSITION

FIELD OF THE INVENTION

The present invention is directed towards a phosphated epoxy resin, aqueous dispersions of said phosphated epoxy resin, electrodepositable coating compositions containing said phosphated epoxy resin, coated substrates, methods of coating substrates, and methods of making a phosphated epoxy resin.

BACKGROUND INFORMATION

Electrodeposition as a coating application method involves the deposition of a film-forming composition onto a conductive substrate under the influence of an applied electrical potential. Electrodeposition has gained popularity in the coatings industry because it provides higher paint utilization, outstanding corrosion resistance, and low environmental contamination as compared with non-electrophoretic coating methods. Some coatings formed from electrodepositable coating compositions have lacked stability to hydrolysis resulting in degradation of the coating film from exposure to water. Other coatings formed from electrodepositable coating compositions are stable to hydrolysis but require high heating temperatures in order to cure the electrodeposited coating. Therefore, an electrodepositable coating composition that cures at low temperatures and results in a coating having hydrolytic stability is desired.

SUMMARY OF THE INVENTION

Disclosed herein is a phosphated epoxy resin comprising at least one terminal group comprising a phosphorous atom covalently bonded to the resin by a carbon-phosphorous bond or by a phosphoester linkage; and at least one carbamate functional group.

Also disclosed herein is an aqueous resinous dispersion comprising: (a) a phosphated epoxy resin comprising: (i) at least one terminal group comprising a phosphorous atom covalently bonded to the resin by a carbon-phosphorous bond or by a phosphoester linkage; and (ii) at least one carbamate functional group; and (b) a curing agent.

Further disclosed herein is a method of making a phosphated epoxy resin, the method comprising: reacting an epoxy resin comprising at least one terminal epoxide functional group and at least one pendant hydroxyl functional group with a molecule comprising an isocyanato functional group and a carbamate functional group, wherein the pendant hydroxyl functional group and isocyanato functional group react to form a urethane linkage, whereby the molecule is incorporated into the epoxy resin to form a carbamate-functional epoxy resin; and further reacting the carbamate-functional epoxy resin with a phosphoric acid, a phosphonic acid, a phosphinic acid, or combinations thereof, wherein the at least one terminal epoxide functional group of the carbamate-functional epoxy resin reacts with an acid group of the phosphoric acid or phosphonic acid, whereby the phosphoric acid and/or the phosphonic acid is incorporated into the carbamate-functional epoxy resin to form the phosphated epoxy resin comprising at least one carbamate functional group.

Still further disclosed herein is a method of coating a substrate comprising electrophoretically depositing an aqueous resinous dispersion onto the substrate to form a coating on the substrate, the aqueous resinous dispersion comprising: (a) a phosphated epoxy resin comprising: (i) at least one terminal group comprising a phosphorous atom covalently bonded to the resin by a carbon-phosphorous bond or by a phosphoester linkage; and (ii) at least one carbamate functional group; and (b) a curing agent.

Also disclosed herein is a coated substrate, wherein the coated substrate is at least partially coated with an aqueous resinous dispersion comprising: (a) a phosphated epoxy resin comprising: (i) at least one terminal group comprising a phosphorous atom covalently bonded to the resin by a carbon-phosphorous bond or by a phosphoester linkage; and (ii) at least one carbamate functional group; and (b) a curing agent.

Further disclosed herein is a part at least partially coated with an aqueous resinous dispersion comprising: (a) a phosphated epoxy resin comprising: (i) at least one terminal group comprising a phosphorous atom covalently bonded to the resin by a carbon-phosphorous bond or by a phosphoester linkage; and (ii) at least one carbamate functional group; and (b) a curing agent.

Still further disclosed herein is a vehicle comprising a part at least partially coated with an aqueous resinous dispersion comprising: (a) a phosphated epoxy resin comprising: (i) at least one terminal group comprising a phosphorous atom covalently bonded to the resin by a carbon-phosphorous bond or by a phosphoester linkage; and (ii) at least one carbamate functional group; and (b) a curing agent.

Also disclosed herein is a vehicle at least partially coated with an aqueous resinous dispersion comprising: (a) a phosphated epoxy resin comprising: (i) at least one terminal group comprising a phosphorous atom covalently bonded to the resin by a carbon-phosphorous bond or by a phosphoester linkage; and (ii) at least one carbamate functional group; and (b) a curing agent.

Further disclosed herein is an aqueous resinous dispersion comprising: (a) a phosphated epoxy resin; and (b) a carbamate-functional oligomer comprising at least two carbamate functional groups.

DETAILED DESCRIPTION OF THE INVENTION

As stated above, the present invention is directed to a phosphated epoxy resin comprising: at least one terminal group comprising a phosphorous atom covalently bonded to the resin by a carbon-phosphorous bond or by a phosphoester linkage; and at least one carbamate functional group.

As used herein, term "phosphated epoxy resin" refers to an ungelled epoxy resin derived from at least an epoxy-functional monomer, oligomer, or polymer, and a phosphorous-atom containing compound, such as a phosphorous acid. By "ungelled" is meant the resins are substantially free of crosslinking and have an intrinsic viscosity when dissolved in a suitable solvent, as determined, for example, in accordance with ASTM-D1795 or ASTM-D4243. The intrinsic viscosity of the reaction product is an indication of its molecular weight. A gelled reaction product, on the other hand, since it is of essentially infinitely high molecular weight due to substantial crosslinking of the resin molecules, will have an intrinsic viscosity too high to measure (i.e., cannot be dissolved in a solvent). As used herein, a reaction product that is "substantially free of crosslinking" refers to a reaction product that has a z-average molecular weight (Mz) of less than 500,000 g/mol. It will be understood that although referred to as a phosphated epoxy resin, the phosphated epoxy resin may be described as being derived from epoxy resins in which at least a portion or all of the epoxide functionality has been reacted and is no longer present.

According to the present invention, the phosphated epoxy resin comprises at least one terminal group comprising a phosphorous atom covalently bonded to the resin by a carbon-phosphorous bond or by a phosphoester linkage. The phosphorous atom may have one, two, three or four covalently bonded oxygen atom(s). At least one of the oxygen atoms may be covalently bonded to the phosphorous atom by a double bond. As used herein, the term "phosphoester linkage" refers to a covalent bond between a carbon atom and an oxygen of a phosphoester group, as demonstrated in the following exemplary structure:

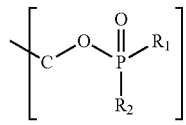

wherein $R_1$ and $R_2$ each represent hydrogen, hydroxyl, an alkyl radical, an aryl radical, or an additional phosphoester group. As used herein, the term "phosphoester group" refers to an oxygen atom covalently bonded to an alkyl radical or an aryl radical, wherein the oxygen atom is also covalently bonded to a phosphorous atom that is bonded to an additional oxygen atom by a double bond. For example, in the structure above, $R_1$ or $R_2$ will be considered to be a phosphoester group when $R_1$ or $R_2$ is O—R, wherein R is an alkyl radical or an aryl radical. It will be understood that the phosphorous atom may comprise three phosphoester groups, including the phosphoester linkage.

The terminal group may comprise phosphate, organophosphate, phosphonate, organophosphonate, phosphinate, organophosphinate, or, if multiple terminal groups are present, combinations thereof.

The terminal group comprising a phosphorous atom covalently bonded to the resin by a phosphoester linkage may be according to the structure:

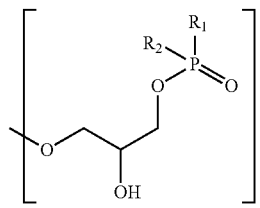

wherein $R_1$ and $R_2$ each independently represent hydrogen, hydroxyl, an alkyl radical, an aryl radical, or a phosphoester group. Multiple terminal groups according to this structure may be present on the phosphated epoxy resin. For example, the phosphated epoxy resin may comprise at least two terminal groups comprising a phosphorous atom covalently bonded to the resin by a phosphoester linkage. A phosphated epoxy resin having two terminal groups comprising a phosphorous atom covalently bonded to the resin by a phosphoester linkage may be according to the structure:

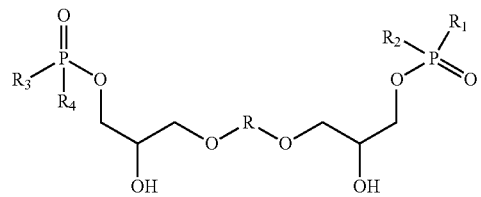

wherein $R_1$, $R_2$, $R_3$ and $R_4$ each independently represent hydrogen, hydroxyl, an alkyl radical, an aryl radical, or a phosphoester group, and R represents the remainder of the phosphated epoxy resin. The remainder of the phosphated epoxy resin may comprise the remainder or residue of an epoxy-functional polymer. As used herein, the term "remainder or residue of an epoxy-functional polymer" with respect to an R-group refers to the polymeric backbone of the epoxy-functional polymer and any substituents present thereon that are not shown in the molecular structure. The remainder of the phosphated epoxy resin and/or remainder or residue of the epoxy-functional polymer may be aliphatic, aromatic, cyclic, acyclic, alicylic or heterocyclic. It should be understood that when $R_1$, $R_2$, $R_3$ or $R_4$ are hydroxyl, the $R_x$-group comprises a phosphoacid group that may further react with an epoxide functional groups of an additional epoxy-containing polymer that results in a phosphated epoxy resin having an increased chain length with the phosphorous atom present in the polymer backbone. In addition, branching from the phosphorous acid may occur if two phosphoacid groups are present and each reacts with an epoxide functional group of an epoxy-containing polymer.

The phosphated epoxy resin may further comprise other terminal functional groups including, for example, epoxide, hydroxyl, thiol, amino, urea, amide, and/or carboxylic acid functional groups. Alternatively, the phosphated epoxy resin may be substantially free, essentially free, or completely free of any or all of these functional groups. As used herein, the term "substantially free", "essentially free" or "completely free" with respect to the presence of a functional group means that the functional group is present in an amount of 3% or less, 0.1% or less, or 0.00%, respectively, the percentage based upon the total number of the functional group relative to the total number of epoxide, hydroxyl, thiol, amino, urea, amide, and/or carboxylic acid functional groups.

As used herein, the term "terminal" with respect to a functional group of a polymer refers to a functional group that is not pendant to the polymeric backbone of the polymer and forms a terminus of the polymeric chain. As used herein, the term "pendant" with respect to a functional group refers to a functional group of a polymer that is present as a side group to the polymeric backbone and does not form a terminus of the polymeric chain. The term "pendant" may also refer to a substituted or unsubstituted hydrocarbon moiety attached to the larger polymeric backbone. The term "pendant group" may be used to refer to both a pendant functional group or a functional group present in a pendant chain. As used herein, the term "pendant chain" refers to a substituted or unsubstituted hydrocarbon moiety extending from the main polymer backbone. An exemplary structure showing a linear polymer backbone having terminal and pendant groups, and an exemplary structure showing a branched polymer backbone having terminal and pendant groups are produced below. The terminal groups are represented by the letter 'A' and the pendant groups are represented by the letter 'B', with the polymer backbone represented by a wavy line.

Linear polymer:

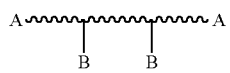

Tri-branched polymer:

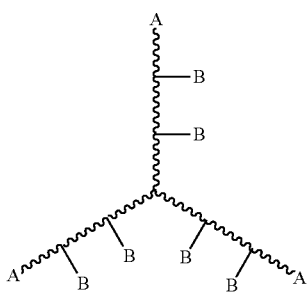

A further non-limiting example of a polymer having terminal groups and pendant groups is the epoxy-functional polymer resulting from the reaction of an excess of diglycidyl ether of bisphenol A with bisphenol A. The resulting polymer has at least one terminal epoxide group (assuming at least one end of the polymeric chain terminates with diglycidyl ether of bisphenol A) and at least one pendant hydroxyl group resulting from the epoxide ring-opening reaction of a hydroxyl functional group from bisphenol A with an epoxide functional group from diglycidyl ether of bisphenol A. In addition, a pendant chain may be introduced by reacting a compound with a pendant functional group on the backbone, such as, for example, the pendant hydroxyl functional group.

According to the present invention, the phosphated epoxy resin of the present invention may comprise a reaction product of a reaction mixture comprising an epoxy-functional polymer and a phosphorous acid. Accordingly, the phosphated epoxy resin may comprise the residue of an epoxy-functional polymer and a phosphorous acid.

The epoxy-functional polymer may comprise a polyepoxide. The polyepoxide may comprise a polyglycidyl ether of a polyphenol, such as bisphenol A. As will be appreciated, such polyepoxides can be produced by etherification of a polyphenol with an epichlorohydrin in the presence of an alkali. Suitable polyphenols include, without limitation, 1,1-bis(4-hydroxyphenyl)ethane; 2,2-bis(4-hydroxyphenyl)propane; 1,1-bis(4-hydroxyphenyl)isobutane; 2,2-bis(4-hydroxytertiarybutylphenyl)propane; bis(2-hydroxynaphthyl)methane; 1,5-dihydroxynaphthalene; 1,1-bis(4-hydroxy-3-allylphenyl)ethane; and 4,4-bis(4'-hydroxyphenyl)valeric acid. Another class of polyepoxides may be produced similarly from polyphenol resins.

The epoxy-functional polymer may comprise a polymeric backbone comprising a polyepoxide that has been chain extended by reaction with a compound having at least two functional groups reactive with epoxy groups, such as, for example, di-functional compounds such as diols, diphenols (including Bisphenol A), dicarboxylic acids, dithiols, and/or diamines. These reactions may chain-extend the polymeric backbone of the epoxy resin and increase its molecular weight. The epoxide functional groups from the polyepoxide should be present in a stoichiometric excess such that the resulting polymer comprises at least one terminal epoxide functional group.

In addition to the polyepoxide(s), the reaction mixture may comprise a monomeric monoepoxide such as monoglycidyl ethers of alcohols and phenols, such as phenyl glycidyl ether, and glycidyl esters of monocarboxylic acids such as glycidyl neodecanoate. Alternatively, the reaction mixture may be substantially free, essentially free, or completely free of such monomers, and the phosphated epoxy resin may also be substantially free, essentially free, or completely free of the residue of such monomers. The terms substantially free, essentially free, and completely free as used with respect to the monomeric monoepoxide means less than 5% by weight, less than 1% by weight, and 0.0% by weight, respectively, of monoepoxide are present, if at all, based on the total weight of the reaction mixture or based on the weight of the phosphated epoxy resin.

The epoxy-functional polymer may be substantially free, essentially free, or completely free of pendant epoxide functional groups. As used herein, an epoxy-functional polymer is substantially free of pendant epoxide functional groups when 1 or less pendant epoxide functional group are present per molecule of the epoxy-functional polymer. As used herein, an epoxy-functional polymer is essentially free of pendant epoxide functional groups when 0.1 or less pendant epoxide functional group are present per molecule of the epoxy-functional polymer. As used herein, an epoxy-functional polymer is completely free of pendant epoxide functional groups when pendant epoxide functional group are not present in the epoxy-functional polymer.

The terminal group comprising a phosphorous atom covalently bonded to the resin by a phosphoester linkage may be produced by the reaction of a phosphorous acid with a terminal epoxide group of an epoxy-functional polymer. The phosphorous acid may comprise a phosphoric acid, a phosphonic acid, a phosphinic acid, or combinations thereof.

Non-limiting examples of phosphoric acids that could react with epoxide functional groups include a 100 percent orthophosphoric acid or a phosphoric acid aqueous solution such as is referred to as an 85 percent phosphoric acid. Other forms of phosphoric acid such as superphosphoric acid, diphosphoric acid and triphosphoric acid may be used. Also, the polymeric or partial anhydrides of phosphoric acids can be employed. The aqueous phosphoric acids that may comprise about 70 to 90 percent, such as about 85 percent phosphoric acid are employed.

Non-limiting examples of phosphonic acids are organophosphonic acids of the structure:

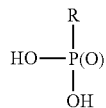

wherein R is organic radical such as those having a total of 1-30, such as 6-18 carbons. R can be aliphatic, aromatic or mixed aliphatic/aromatic and can be an unsubstituted hydrocarbon or a substituted hydrocarbon.

Non-limiting examples of phosphinic acids are organophosphinic acids of the structure:

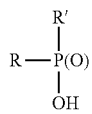

wherein R and R' are each independently hydrogen or an organic radical. Examples of such radicals are those having a total of 1-30, such as 6-18 carbons. The organic component of the phosphinic acid (R, R') can be aliphatic, aromatic or mixed aliphatic/aromatic. R and R' can be an unsubstituted hydrocarbon or a substituted hydrocarbon.

Non-limiting specific examples of organophosphonic acids and organophosphinic acids are: 3-amino propyl phosphonic acid, 4-methoxyphenyl phosphonic acid, benzylphosphonic acid, butylphosphonic acid, carboxyethylphosphonic acid, diphenylphosphinic acid, dodecylphosphonic acid, ethylidenediphosphonic acid, heptadecylphosphonic acid, methylbenzylphosphinic acid, naphthylmethylphosphinic acid, octadecylphosphonic acid, octylphosphonic acid, pentylphosphonic acid, methylphenylphosphinic acid, phenylphosphonic acid, styrene phosphonic acid, dodecyl bis-1,12-phosphonic acid, poly(ethylene glycol) phosphonic acid, including mixtures thereof.

The phosphated epoxy resin may be substantially free, essentially free, or completely free of pendant groups comprising a phosphorous atom covalently bonded to the resin by a carbon-phosphorous bond or by a phosphoester linkage. As used herein, a phosphated epoxy resin is substantially free of such pendant groups when less than 1 theoretical pendant phosphorous atom-containing groups are present per molecule of the resin. As used herein, the theoretical pendant phosphorous atom-containing group refers to a group that would theoretically be present as a pendant phosphorous atom-containing group in view of the raw materials and method used to make the phosphated epoxy resin. For example, an epoxy-containing polymer having one pendant epoxide functional group that reacts with a phosphorous acid would have one theoretical pendant phosphorous-containing groups because the phosphorous acid would be expected to react with the pendant epoxide functional group. Another example is a phosphorous-containing molecule that is reacted or grafted with a pendant group present on a polymer such as, for example, the reaction of a pendant unsaturated group on the polymer with a phosphorous-containing compound. Such reaction would be expected to result in a pendant phosphorous atom-containing group. As used herein, a phosphated epoxy resin is essentially free of such pendant groups when less than 0.1 theoretical pendant phosphorous atom-containing groups are present per molecule of the resin. As used herein, a phosphated epoxy resin is completely free of such pendant groups when such pendant groups are not theoretically present in the phosphated epoxy resin.

The phosphated epoxy resin may comprise functional groups such as, for example, carbamate, thiol, amino, urea, amide, and carboxylic acid functional groups. Alternatively, the phosphated epoxy resin may be substantially free, essentially free, or completely free of any of these functional groups. As used herein, the term "substantially free", "essentially free" or "completely free" with respect to the presence of a functional group means that the functional group is present in an amount of 3% or less, 0.1% or less, or 0.00%, respectively, the percentage based upon the total number of the functional group relative to the total number of carbamate, thiol, amino, urea, amide, and carboxylic acid functional groups.

According to the present invention, the phosphated epoxy resin may comprise at least one carbamate functional group. As used herein, the term "carbamate functional group" refers to a functional group on the phosphated epoxy resin having the structure:

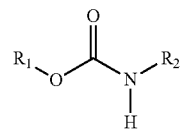

wherein $R_1$ comprises the remainder of the phosphated epoxy resin and may optionally further comprise an additional organic linking group binding the carbamate functional group to the polymeric backbone of the phosphated epoxy resin, and $R_2$ comprises hydrogen, an alkyl radical, or an aryl radical. The carbamate may be a pendant group, a terminal group, or, if multiple carbamate groups are present, combinations thereof. An organic linking group may bind the epoxy resin backbone and the carbamate functional group together. A specific non-limiting example of a moiety comprising the carbamate functional group and an organic linking group binding the carbamate functional group to the epoxy resin backbone may be the structure:

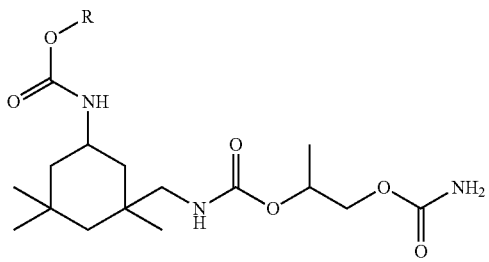

wherein R represents the remainder of the phosphated epoxy resin.

The phosphated epoxy resin may further comprise at least one hydroxyl functional group in addition to the carbamate functional group(s). The hydroxyl group may be present as a substituent on the epoxy-functional polymer itself, or the hydroxyl group may be the result of a ring-opening reaction of an epoxide functional group of the epoxy-functional polymer.

In addition to carbamate functional group(s) and/or hydroxyl functional group(s), the phosphated epoxy resin may optionally further comprise additional functional groups, such as, for example, thiol, amino, urea, amide, and carboxylic acid functional groups. Alternatively, the phosphated epoxy resin may be substantially free, essentially free, or completely free of any or all of these functional groups. As used herein, the term "substantially free", "essentially free" or "completely free" with respect to the presence of a functional group means that the functional group is present in an amount of 3% or less, 0.1% or less, or 0.00%, respectively, the percentage based upon the total number of the functional group relative to the total number of carbamate, hydroxyl, thiol, amino, urea, amide, and carboxylic acid functional groups.

The phosphated epoxy resin may comprise at least one constitutional unit A comprising the structure:

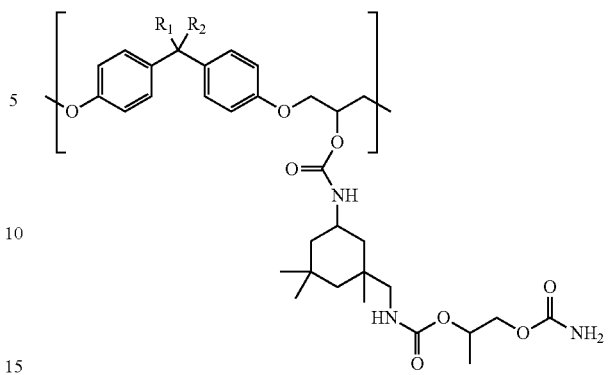

wherein $R_1$ and $R_2$ each independently represent hydrogen, an alkyl radical or an aryl radical. For example, $R_1$ and $R_2$ each independently may represent hydrogen, methyl, ethyl, propyl, butyl, or phenyl groups. In addition, the aromatic rings may be substituted.

The phosphated epoxy resin may further comprise at least one constitutional unit B comprising the structure:

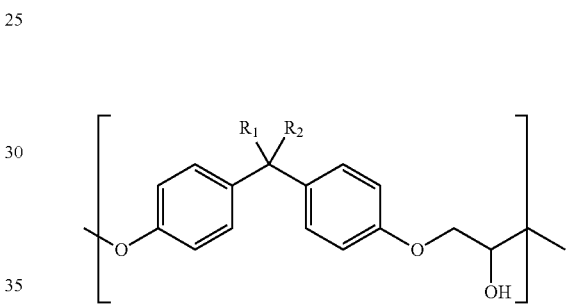

wherein $R_1$ and $R_2$ each independently represent hydrogen, an alkyl radical or an aryl radical. For example, $R_1$ and $R_2$ each independently may represent hydrogen, methyl, ethyl, propyl, butyl, or phenyl groups. In addition, the aromatic rings may be substituted.

The phosphated epoxy resin may comprise a ratio of constitutional unit A to constitutional unit B from 1:20 to 20:1, such as 1:10 to 10:1, such as 1:5 to 5:1, such as 1:2 to 2:1, such as 1:1.1 to 1.1:1.

The phosphated epoxy resin may comprise the structure:

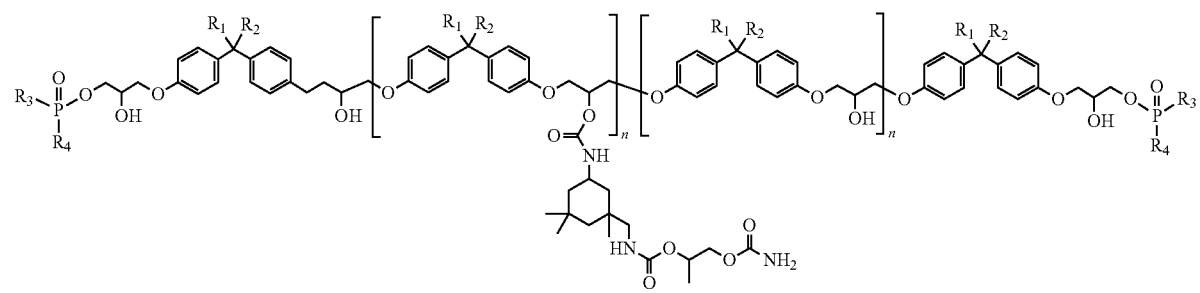

wherein m is 1 to 2,000 and n is 0 to 2,000; $R_1$ and $R_2$ each independently represent hydrogen, an alkyl radical or an aryl radical; $R_3$ and $R_4$ each independently represent hydrogen, hydroxyl, an alkyl radical, an aryl radical, or a phosphoester group. For example, $R_1$ and $R_2$ each independently may represent hydrogen, methyl, ethyl, propyl, butyl, or phenyl groups. In addition, the aromatic rings may be substituted. Although the structure shows a block polymer comprising a carbamate functional block and a hydroxyl functional block, the polymer may comprise random polymer segments and polymerization products as well.

According to the present invention, the phosphated epoxy resin may be dispersed in a dispersing medium comprising water. The phosphated epoxy resin may be, prior to or during dispersion in a dispersing medium comprising water, at least partially neutralized by, for example, treating with a base to form a water-dispersible anionic salt group-containing phosphated epoxy resin. As used herein, the term "water-dispersible" means that a material is adapted to be solubilized, dispersed, and/or emulsified in water. As used herein, the term "anionic salt group-containing phosphated epoxy resin" refers to a phosphated epoxy resin comprising at least partially neutralized anionic functional groups, such as, for example, phosphoric acid groups, that impart a negative charge to the resin. Non-limiting examples of suitable bases include both organic and inorganic bases. Illustrative examples of suitable bases are ammonia, monoalkylamines, dialkylamines, or trialkylamines such as ethylamine, propylamine, dimethylamine, dibutylamine and cyclohexylamine; monoalkanolamine, dialkanolamine or trialkanolamine such as ethanolamine, diethanolamine, triethanolamine, propanolamine, isopropanolamine, diisopropanolamine, dimethylethanolamine and diethylethanolamine; morpholines, e.g., N-methylmorpholine or N-ethylmorpholine. The percent of neutralization is such as would make the resin water-dispersible and electrophoretic. One or more of such bases may be added to the phosphated epoxy resin in an amount sufficient to theoretically neutralize the phosphated epoxy resin from, for example, 20 to 200 percent, such as 40 to 150 percent, such as 60 to 120 percent of theoretical neutralization.

The z-average molecular weight ($M_z$) of the phosphated epoxy resin may be at least 20,000 g/mol, such as at least 50,000 g/mol, such as at least 75,000 g/mol, and may be no more than 500,000 g/mol, such as no more than 350,000 g/mol, such as no more than 300,000 g/mol, such as no more than 250,000 g/mol, such as no more than 150,000 g/mol. The molecular weight of the phosphated epoxy resin may be 20,000 g/mol to 500,000 g/mol, 20,000 g/mol to 350,000 g/mol, such as 50,000 g/mol to 300,000 g/mol, such as 75,000 g/mol to 250,000 g/mol, such as 75,000 g/mol to 150,000 g/mol. As used herein, the term "z-average molecular weight" or "($M_z$)" means the z-average molecular weight ($M_z$) as determined by gel permeation chromatography (GPC) using Waters 2695 separation module with a Waters 410 differential refractometer (RI detector), linear polystyrene standards having molecular weights of from 580 Da to 365,000 Da, dimethylformamide (DMF) with 0.05M lithium bromide (LiBr) as the eluent at a flow rate of 0.5 mL/min, and one Shodex Asahipak GF-510 HQ column (300×7.5 mm, 5 μm) for separation.

The present invention is also directed towards a method of making a phosphated epoxy resin comprising at least one carbamate functional group. The method may comprise reacting an epoxy-functional polymer comprising at least one terminal epoxide functional group and at least one pendant hydroxyl functional group with a molecule comprising an isocyanato functional group and a carbamate functional group, wherein the pendant hydroxyl functional group and isocyanato functional group react to form a urethane linkage, whereby the molecule is incorporated into the epoxy resin to form a carbamate-functional epoxy resin. The molar ratio of the molecule to hydroxyl functional groups of the epoxy-functional polymer may be 1:20 to 20:1, such as 1:10 to 10:1, such as 1:5 to 5:1, such as 1:2 to 2:1, such as 1:1.1 to 1.1:1, such that the resulting carbamate-functional epoxy resin has a carbamate functional group to hydroxyl functional group ratio of 1:20 to 20:1, such as 1:10 to 10:1, such as 1:5 to 5:1, such as 1:2 to 2:1, such as 1:1.1 to 1.1:1. When reacting the epoxy-functional polymer with the molecule comprising an isocyanato functional group and a carbamate functional group, the epoxy-functional polymer may be substantially free, essentially free, or completely free of pendant or terminal groups comprising a phosphorous atom. The carbamate-functional epoxy resin may be further reacted with phosphoric acid, phosphonic acid, phosphinic acid, or combinations thereof, wherein the at least one terminal epoxide functional group of the carbamate-functional epoxy resin reacts with an acid group of the phosphoric acid, phosphonic acid, or phosphinic acid whereby the phosphoric acid, the phosphonic acid, and/or phosphinic acid is incorporated into the carbamate-functional epoxy resin through a phosphoester bond to form a phosphated, carbamate-functional epoxy resin. The phosphated, carbamate-functional epoxy resin may optionally be neutralized with a base.

The present invention is also directed towards an aqueous resinous dispersion comprising the phosphated epoxy resin described above and a curing agent. The aqueous resinous dispersion comprises a dispersion of the phosphated epoxy resin in a continuous phase of an aqueous medium. For example, the aqueous medium may comprise at least 80% by weight water, based on the total weight of the aqueous medium. The aqueous medium may further comprise one or more organic solvents. Examples of suitable organic solvents include oxygenated organic solvents, such as monoalkyl ethers of ethylene glycol, diethylene glycol, propylene glycol, and dipropylene glycol which contain from 1 to 10 carbon atoms in the alkyl group, such as the monoethyl and monobutyl ethers of these glycols. Examples of other at least partially water-miscible solvents include alcohols such as ethanol, isopropanol, butanol and diacetone alcohol. If used, the amount of organic solvent present in the aqueous dispersion may be less than 20% by weight, such as less than 10% by weight, such as less than 5% by weight, such as less than 2% by weight, with the % by weight being based on the total weight of the aqueous medium. The curing agent, and any other optional ingredients, may be present is the dispersed resinous phase, the continuous phase, a third phase that is neither the resinous phase nor the continuous phase, or in a combination of the resinous phase, continuous phase and/or third phase, and may be either solubilized, dispersed, or a combination thereof.

According to the present invention, the phosphated epoxy resin may be present in the aqueous resinous dispersion in an amount of at least 50% by weight, such as at least 55% by weight, such as at least 60% by weight, and may be present in an amount of no more than 90% by weight, such as no more than 80% by weight, such as no more than 75% by weight, based on the total weight of the resin solids of the aqueous resinous dispersion. The phosphated epoxy resin may be present in the aqueous resinous dispersion in an amount 50% to 90%, such as 55% to 80%, such as 60% to 75%, based on the total weight of the resin solids of the aqueous resinous dispersion.

The present invention is also directed to an aqueous resinous dispersion comprising a phosphated epoxy resin and a carbamate-functional oligomer comprising at least two carbamate groups. When the phosphated epoxy resin comprises at least one carbamate functional group, the carbamate-functional oligomer may optionally be present in the aqueous resinous dispersion. The carbamate-functional oligomer may comprise three or more carbamate functional groups and may comprise the structure:

gomer described above, it has been surprisingly discovered that the coating deposited from the resinous dispersion may demonstrate a decreased length of filiform corrosion when compared to a comparative coating composition that does not include the carbamate-functional oligomer, as measured according to the Filiform Corrosion Test Method. The improvement in filiform corrosion resistance (i.e., decreased length of filament) is observed regardless of whether the phosphated epoxy resin comprises a carbamate functional group. Accordingly, the present invention is also directed to an aqueous resinous dispersion comprising a phosphated epoxy resin and the carbamate-functional oligomer.

As used herein, the "Filiform Corrosion Test Method" refers to inscribing a 3.75 inch by 3.75 inch (95.25 mm by 95.25 mm) "X" into the coated panel surface to a sufficient depth to penetrate any surface coating to expose the underlying metal and placing the panels horizontally in a desiccator containing a thin layer of 12 N hydrochloric acid (HCl) for 1 hour at ambient temperature, wherein only the HCl fumes shall come into contact with the sample. Within 5 minutes of removal from the desiccator, the panels are placed in a vertical orientation in a humidity cabinet maintained at 40° C. and 80% relative humidity for 960 hours.

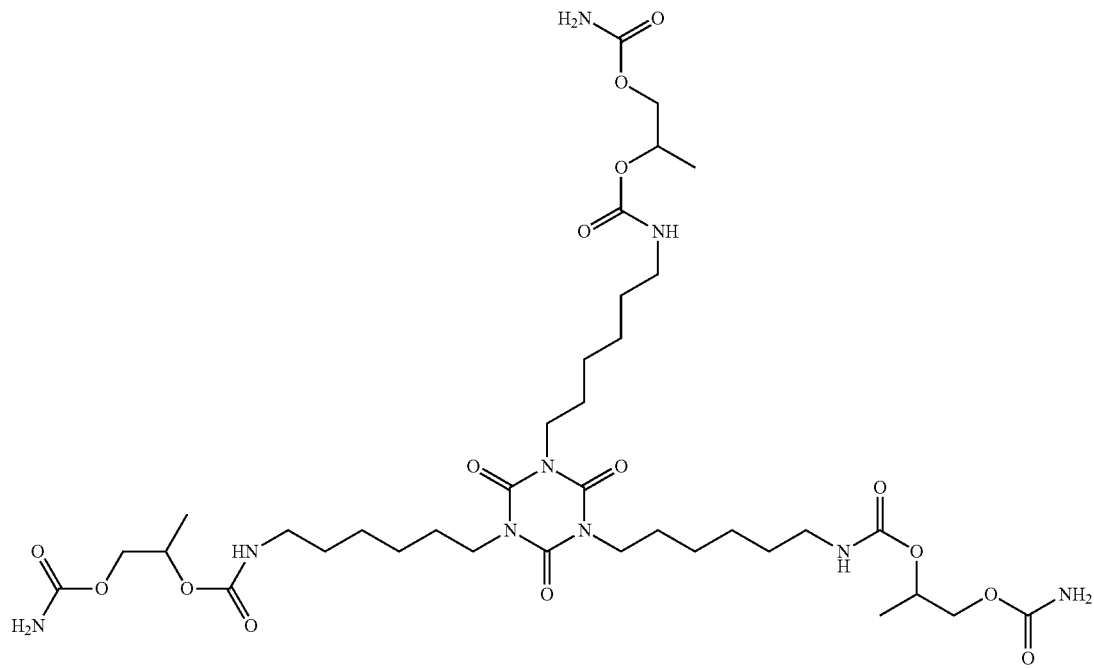 [SMILES: CC(COC(N)=O)OC(=O)NCCCCCCn1c(=O)n(CCCCCCNC(=O)OC(C)COC(N)=O)c(=O)n(CCCCCCNC(=O)OC(C)COC(N)=O)c1=O]

The carbamate-functional oligomer may be present in the aqueous resinous dispersion in an amount of at least 10% by weight, such as at least 15% by weight, such as at least 20% by weight, and may be present in an amount of no more than 50% by weight, such as no more than 45% by weight, such as no more than 40% by weight, based on the total weight of the resin solids of the aqueous resinous dispersion. The carbamate-functional oligomer may be present in the aqueous resinous dispersion in an amount of 10% to 55% by weight, such as 15% to 50% by weight, such as 20% to 45% by weight, based on the total weight of the resin solids of the aqueous resinous dispersion.

According to the present invention, when the aqueous resinous dispersion comprises the carbamate-functional oli- The panels are then visually inspected for the presence of filaments, i.e., corrosion damage extending from the scribed area into the area underneath the coating, and any filaments present are measured for length from the scribe. Duplicate panels are included for testing and the results are averaged. The length of the filaments may be referred to as the length of filiform corrosion.

According to the present invention, the aqueous resinous dispersions of the present invention may further comprise a curing agent. The curing agent may comprise at least two functional groups that react with the reactive groups, such as carbamate and active hydrogen functional groups, of the phosphated epoxy resin to cure the coating composition to form a coating. As used herein, the term "cure", "cured" or similar terms, as used in connection with the aqueous resinous dispersion described herein, means that at least a portion of the components that form the aqueous resinous dispersion are crosslinked to form a thermoset coating. Additionally, curing of the aqueous resinous dispersion refers to subjecting said composition to curing conditions (e.g., elevated temperature) leading to the reaction of the reactive functional groups of the components of the aqueous resinous dispersion, and resulting in the crosslinking of the components of the composition and formation of an at least partially cured coating. Non-limiting examples of suitable curing agents are at least partially blocked polyisocyanates, aminoplast resins and phenoplast resins, such as phenol-formaldehyde condensates including allyl ether derivatives thereof.

Suitable at least partially blocked polyisocyanates include aliphatic polyisocyanates, aromatic polyisocyanates, and mixtures thereof. The curing agent may comprise an at least partially blocked aliphatic polyisocyanate. Suitable at least partially blocked aliphatic polyisocyanates include, for example, fully blocked aliphatic polyisocyanates, such as those described in U.S. Pat. No. 3,984,299 at col. 1 line 57 to col. 3 line 15, this portion of which is incorporated herein by reference, or partially blocked aliphatic polyisocyanates that are reacted with the polymer backbone, such as is described in U.S. Pat. No. 3,947,338 at col. 2 line 65 to col. 4 line 30, this portion of which is also incorporated herein by reference. By "blocked" is meant that the isocyanate groups have been reacted with a compound such that the resultant blocked isocyanate group is stable at ambient temperature but reactive at elevated temperatures, such as between 90° C. and 200° C. The polyisocyanate curing agent may be a fully blocked polyisocyanate with substantially no free isocyanato groups.

The polyisocyanate curing agent may comprise a diisocyanate, higher functional polyisocyanates or combinations thereof. For example, the polyisocyanate curing agent may comprise aliphatic and/or aromatic polyisocyanates. Aliphatic polyisocyanates may include (i) alkylene isocyanates, such as trimethylene diisocyanate, tetramethylene diisocyanate, pentamethylene diisocyanate, hexamethylene diisocyanate ("HDI"), 1,2-propylene diisocyanate, 1,2-butylene diisocyanate, 2,3-butylene diisocyanate, 1,3-butylene diisocyanate, ethylidene diisocyanate, and butylidene diisocyanate, and (ii) cycloalkylene isocyanates, such as 1,3-cyclopentane diisocyanate, 1,4-cyclohexane diisocyanate, 1,2-cyclohexane diisocyanate, isophorone diisocyanate, methylene bis(4-cyclohexylisocyanate) ("HMDI"), the cyclo-trimer of 1,6-hexmethylene diisocyanate (also known as the isocyanurate trimer of HDI, commercially available as Desmodur N3300 from Convestro AG), and meta-tetramethylxylylene diisocyanate (commercially available as TMXDI® from Allnex SA). Aromatic polyisocyanates may include (i) arylene isocyanates, such as m-phenylene diisocyanate, p-phenylene diisocyanate, 1,5-naphthalene diisocyanate and 1,4-naphthalene diisocyanate, and (ii) alkarylene isocyanates, such as 4,4'-diphenylene methane ("MDI"), 2,4-tolylene or 2,6-tolylene diisocyanate ("TDI"), or mixtures thereof, 4,4-toluidine diisocyanate and xylylene diisocyanate. Triisocyanates, such as triphenyl methane-4, 4',4"-triisocyanate, 1,3,5-triisocyanato benzene and 2,4,6-triisocyanato toluene, tetraisocyanates, such as 4,4'-diphenyldimethyl methane-2,2',5,5'-tetraisocyanate, and polymerized polyisocyanates, such as tolylene diisocyanate dimers and trimers and the like, may also be used. The curing agent may comprise a blocked polyisocyanate selected from a polymeric polyisocyanate, such as polymeric HDI, polymeric MDI, polymeric isophorone diisocyanate, and the like. The curing agent may also comprise a blocked trimer of hexamethylene diisocyanate available as Desmodur N3300® from Covestro AG. Mixtures of polyisocyanate curing agents may also be used.

The polyisocyanate curing agent may be at least partially blocked with at least one blocking agent selected from a 1,2-alkane diol, for example 1,2-propanediol; a 1,3-alkane diol, for example 1,3-butanediol; a benzylic alcohol, for example, benzyl alcohol; an allylic alcohol, for example, allyl alcohol; caprolactam; a dialkylamine, for example dibutylamine; and mixtures thereof. The polyisocyanate curing agent may be at least partially blocked with at least one 1,2-alkane diol having three or more carbon atoms, for example 1,2-butanediol.

Other suitable blocking agents include aliphatic, cycloaliphatic, or aromatic alkyl monoalcohols or phenolic compounds, including, for example, lower aliphatic alcohols, such as methanol, ethanol, and n-butanol; cycloaliphatic alcohols, such as cyclohexanol; aromatic-alkyl alcohols, such as phenyl carbinol and methylphenyl carbinol; and phenolic compounds, such as phenol itself and substituted phenols wherein the substituents do not affect coating operations, such as cresol and nitrophenol. Glycol ethers and glycol amines may also be used as blocking agents. Suitable glycol ethers include ethylene glycol butyl ether, diethylene glycol butyl ether, ethylene glycol methyl ether and propylene glycol methyl ether. Other suitable blocking agents include oximes, such as methyl ethyl ketoxime, acetone oxime and cyclohexanone oxime.

Alternatively, the aqueous resinous dispersion may be substantially free, essentially free, or completely free of blocked polyisocyanate curing agents. As used herein, the term "substantially free", "essentially free" or "completely free" with respect to the presence of blocked polyisocyanate curing agents means that the blocked polyisocyanate curing agent is present, if at all, in an amount of 5% or less, 1% or less, or 0.00%, respectively, the percentage based upon the total weight of the resin solids of the aqueous resinous dispersion.

The curing agent may comprise an aminoplast resin. Aminoplast resins are condensation products of an aldehyde with an amino- or amido-group carrying substance. Condensation products obtained from the reaction of alcohols and an aldehyde with melamine, urea or benzoguanamine may be used. However, condensation products of other amines and amides may also be employed, for example, aldehyde condensates of triazines, diazines, triazoles, guanidines, guanamines and alkyl- and aryl-substituted derivatives of such compounds, including alkyl- and aryl-substituted ureas and alkyl- and aryl-substituted melamines. Some examples of such compounds are N,N'-dimethyl urea, benzourea, dicyandiamide, formaguanamine, acetoguanamine, ammeline, 2-chloro-4,6-diamino-1,3,5-triazine, 6-methyl-2, 4-diamino-1,3,5-triazine, 3,5-diaminotriazole, triaminopyrimidine, 2-mercapto-4,6-diaminopyrimidine, 3,4,6-tris(ethylamino)-1,3,5-triazine, and the like. Suitable aldehydes include formaldehyde, acetaldehyde, crotonaldehyde, acrolein, benzaldehyde, furfural, glyoxal and the like.

The aminoplast resins may contain methylol or similar alkylol groups, and at least a portion of these alkylol groups may be etherified by a reaction with an alcohol to provide organic solvent-soluble resins. Any monohydric alcohol may be employed for this purpose, including such alcohols as methanol, ethanol, propanol, butanol, pentanol, hexanol, heptanol and others, as well as benzyl alcohol and other aromatic alcohols, cyclic alcohol such as cyclohexanol, monoethers of glycols such as Cello solves and Carbitols, and halogen-substituted or other substituted alcohols, such as 3-chloropropanol and butoxyethanol.

Non-limiting examples of commercially available aminoplast resins are those available under the trademark CYMEL® from Allnex Belgium SA/NV, such as CYMEL 1130 and 1156, and RESIMENE® from INEOS Melamines, such as RESIMENE 750 and 753. Examples of suitable aminoplast resins also include those described in U.S. Pat. No. 3,937,679 at col. 16, line 3 to col. 17, line 47, this portion of which being hereby incorporated by reference. As is disclosed in the aforementioned portion of the '679 patent, the aminoplast may be used in combination with the methylol phenol ethers.

Phenoplast resins are formed by the condensation of an aldehyde and a phenol. Suitable aldehydes include formaldehyde and acetaldehyde. Methylene-releasing and aldehyde-releasing agents, such as paraformaldehyde and hexamethylene tetramine, may also be utilized as the aldehyde agent. Various phenols may be used, such as phenol itself, a cresol, or a substituted phenol in which a substituted or unsubstituted hydrocarbon radical having either a straight chain, a branched chain or a cyclic structure is substituted for a hydrogen in the aromatic ring. Mixtures of phenols may also be employed. Some specific examples of suitable phenols are p-phenylphenol, p-tert-butylphenol, p-tert-amylphenol, cyclopentylphenol and unsaturated hydrocarbon-substituted phenols, such as the monobutenyl phenols containing a butenyl group in ortho, meta or para position, and where the double bond occurs in various positions in the unsaturated hydrocarbon chain.

Aminoplast and phenoplast resins, as described above, are described in U.S. Pat. No. 4,812,215 at col. 6, line 20 to col. 7, line 12, the cited portion of which being incorporated herein by reference.

The curing agent may be present in the aqueous resinous dispersion in an amount of at least 10% by weight, such as at least 20% by weight, such as at least 25% by weight, and may be present in an amount of no more than 50% by weight, such as no more than 45% by weight, such as no more than 40% by weight, based on the total weight of the resin solids of the aqueous resinous dispersion. The curing agent may be present in the aqueous resinous dispersion in an amount of 10% to 50% by weight, such as 20% to 45% by weight, such as 25% to 40% by weight, based on the total weight of the resin solids of the aqueous resinous dispersion.

According to the present invention, the aqueous resinous dispersions may optionally comprise a catalyst to catalyze the reaction between the curing agent and the phosphated epoxy resin. As used herein, the term "catalyst" does not include the phosphorous acid reacted with the epoxy resin or any remaining unbound and free phosphorous acid present in the composition. Non-limiting examples of catalysts include latent acid catalysts, specific examples of which are identified in WO 2007/118024 at [0031] and include, but are not limited to, ammonium hexafluoroantimonate, quaternary salts of $SbF_6$ (e.g., NACURE® XC-7231), t-amine salts of $SbF_6$ (e.g., NACURE® XC-9223), Zn salts of triflic acid (e.g., NACURE® A202 and A218), quaternary salts of triflic acid (e.g., NACURE® XC-A230), and diethylamine salts of triflic acid (e.g., NACURE® A233), all commercially available from King Industries, and/or mixtures thereof. Latent acid catalysts may be formed by preparing a derivative of an acid catalyst such as para-toluenesulfonic acid (pTSA) or other sulfonic acids. For example, a well-known group of blocked acid catalysts are amine salts of aromatic sulfonic acids, such as pyridinium para-toluenesulfonate. Such sulfonate salts are less active than the free acid in promoting crosslinking. During cure, the catalysts may be activated by heating.

Alternatively, the aqueous resinous dispersions may be substantially free, essentially free, or completely free of catalyst. As used herein, the term substantially free, essentially free, and completely free with respect to the amount of catalyst refers to compositions having less than 0.1% by weight, less than 0.01% by weight, and 0.00% by weight, respectively, of catalyst, based upon the total weight of the resin solids.

According to the present invention, the aqueous resinous dispersions may comprise other optional ingredients, such as a pigment composition and, if desired, various additives such as fillers, plasticizers, anti-oxidants, biocides, auxiliary polymers or oligomers such as acrylics, polyesters, additional epoxy or phosphated epoxy resins (other than the phosphated epoxy resin described above), rheology modifiers, UV light absorbers and stabilizers, hindered amine light stabilizers, defoamers, fungicides, dispersing aids, flow control agents, surfactants, wetting agents, flatting agents to control gloss, or combinations thereof. Alternatively, the aqueous resinous dispersion may be completely free of any of the optional ingredients, i.e., the optional ingredient is not present in the aqueous resinous dispersion. If present, the pigment composition may comprise organic or inorganic pigments, such as, for example, iron oxides, lead oxides, strontium chromate, carbon black, coal dust, titanium dioxide, talc, barium sulfate, as well as color pigments such as cadmium yellow, cadmium red, chromium yellow and the like. Further non-limiting examples of pigments include metal flakes or particles, such as those of aluminum or zinc, as well as platy inorganic particles, such as talc or clay. It is understood that the size of any insoluble optional ingredients can be nano or micron when added to the formulation and that the size and shape of the particle may affect the activity and the rheological properties of the formulation. Both nano and micron sized particles are suitable for this invention. The pigment content of the dispersion may be expressed as the pigment-to-resin weight ratio and may be within the range of 0.03:1 to 4.00:1, when pigment is present. The other additives mentioned above may be present in the aqueous resinous dispersion in amounts of 0.01% to 3% by weight, based on total weight of the resin solids of the aqueous resinous dispersion.

According to the present invention, the aqueous resinous dispersions may optionally comprise a corrosion inhibitor. As used herein, the term "corrosion inhibitor" refers to any material that may reduce the corrosion rate of a metal substrate such as ferrous substrate or aluminum alloy. The corrosion inhibitor may be soluble or insoluble within the resinous dispersion and may display corrosion inhibiting properties only when the pH of the metal surface is raised or lowered as a result of corrosion. It is understood that the size and shape of insoluble corrosion inhibiting particles may affect the rate at which the active species is released as well as rheological properties. Both nano and micron sized particles are suitable for this invention. Suitable corrosion inhibitors include but are not limited to metal oxides of zinc, manganese, cerium, praseodymium, lanthanum, and yttrium, organosilicon based materials and their oxides, iron phosphate, zinc phosphate, calcium ion-exchanged silica, colloidal silica, synthetic amorphous silica, vanadates and molybdates, such as calcium molybdate, zinc molybdate, barium molybdate, strontium molybdate, and mixtures thereof. Suitable calcium ion-exchanged silica is commercially available from W. R. Grace & Co. as SHIELDEX.

AC3 and/or SHIELDEX. C303. Suitable amorphous silica is available from W. R. Grace & Co. as SYLOID. Suitable zinc hydroxyl phosphate is commercially available from Elementis Specialties, Inc. as NALZIN. 2. The aqueous resinous dispersion may also comprise one or more organic corrosion inhibitors. Examples of such inhibitors include but are not limited to sulfur and/or nitrogen containing heterocyclic compounds, examples of which include azoles, thiophene, hydrazine and derivatives, pyrrole, disulfides and derivatives thereof. Such organic corrosion inhibitors are described in U.S. Publication No. 2013/0065985, paragraph no. 52, which is hereby incorporated by reference. Specific non-limiting examples of corrosion inhibitors comprising sulfur and/or nitrogen containing heterocyclic compounds include 2-mercaptobenzothiazole, 2,5-dimercaptothiadiazole and their sodium, zinc, and potassium salts, the Cobratec® line of products based on benzotriazole and tolytriazole commercially available from PMC Specialties Group, Inc., Hybricor®204, 204S, and Inhibicor 1000 commercially available from WPC Technologies. The corrosion inhibitors may be present in the aqueous resinous dispersion in an amount of 0.1 to 60% by weight, such as 5 to 40% by weight, such as 10 to 25% by weight, based on the total resin solids weight of the dispersion. The corrosion inhibitors may remain substantially unreacted after the aqueous resinous dispersion is applied and cured to form a coating. As used herein, the term "substantially unreacted" with respect to the corrosion inhibitor means that at least partially curing the deposited aqueous resinous dispersion, less than 75% of the total corrosion inhibitor by weight, based on the total weight of the corrosion inhibitor, has been bound to a resin, curing agent or pigment within the coating film via covalent bonds.

Alternatively, the aqueous resinous dispersions may be substantially free, essentially free, or completely free of any of the optional ingredients discussed above. As used herein, the term substantially free, essentially free, and completely free with respect to the amount of optional ingredient refers to compositions having less than 0.1% by weight, less than 0.01% by weight, and 0.00% by weight, respectively, of the optional ingredient, based upon the total weight of the resin solids.

According to the present invention, the total solids content of the aqueous resinous dispersions may be at least 1% by weight, such as at least 5% by weight, and may be no more than 50% by weight, such as no more than 40% by weight, such as no more than 20% by weight, based on the total weight of the aqueous resinous dispersion. The total solids content of the aqueous resinous dispersion may be from 1% to 50% by weight, such as 5% to 40% by weight, such as 5% to 20% by weight, based on the total weight of the aqueous resinous dispersion. As used herein, "total solids" refers to the non-volatile content of the aqueous resinous dispersion, i.e., materials which will not volatilize when heated to 110° C. for 60 minutes.

The present invention is also directed to electrodepositable coating compositions comprising the phosphated epoxy resins described above. The electrodepositable coating composition may comprise the aqueous resinous dispersions comprising the phosphated epoxy resins as the aqueous resinous dispersion itself may be an electrodepositable coating composition. For example, the electrodepositable coating composition may comprise an aqueous resinous dispersion comprising the phosphated epoxy resin comprising at least one carbamate functional group, the curing agent, and optionally the carbamate-functional oligomer. The electrodepositable coating composition may also comprise an aqueous resinous dispersion comprising the phosphated epoxy resin, the curing agent and the carbamate-functional oligomer.

As used herein, the term "electrodepositable coating composition" refers to a composition that is capable of being deposited onto an electrically conductive substrate under the influence of an applied electrical potential.

The present invention is also directed to a method of coating a substrate, comprising electrophoretically depositing the aqueous resinous dispersions described above onto the substrate to form a coating on the substrate. According to the present invention such method may comprise electrophoretically applying an aqueous resinous dispersion as described above to at least a portion of the substrate and curing the coating composition to form an at least partially cured coating on the substrate. According to the present invention, the method may comprise (a) electrophoretically depositing onto at least a portion of the substrate an aqueous resinous dispersion of the present invention and (b) heating the coated substrate to a temperature and for a time sufficient to cure the electrodeposited coating on the substrate. According to the present invention, the method may optionally further comprise (c) applying directly to the at least partially cured electrodeposited coating one or more pigment-containing coating compositions and/or one or more pigment-free coating compositions to form an additional coating layer over at least a portion of the at least partially cured electrodeposited coating, and (d) curing the additional coating layer by allowing it to set at ambient temperature or by applying a sufficient energy from an external energy source to the coated substrate of step (c) to a condition and for a time sufficient to at least partially cure the additional coating layer. Non-limiting examples of external energy sources include thermal energy and radiation such as ultraviolet, infrared or microwave.

According to the present invention, the aqueous resinous dispersions of the present invention may be deposited upon an electrically conductive substrate by placing the composition in contact with an electrically conductive cathode and an electrically conductive anode, with the surface to be coated being the anode. Following contact with the aqueous resinous dispersion, an adherent film of the coating composition is deposited on the anode when a sufficient voltage is impressed between the electrodes. The conditions under which the electrodeposition is carried out are, in general, similar to those used in electrodeposition of other types of coatings. The applied voltage may be varied and can be, for example, as low as one volt to as high as several thousand volts, such as between 50 and 500 volts. The current density may be between 0.1 ampere and 15 amperes per square foot and tends to decrease during electrodeposition indicating the formation of an insulating film.

Once the aqueous resinous dispersion is electrodeposited over at least a portion of the electroconductive substrate, the coated substrate may be heated to a temperature and for a time sufficient to at least partially cure the electrodeposited coating on the substrate. As used herein, the term "at least partially cured" with respect to a coating refers to a coating formed by subjecting the coating composition to curing conditions such that a chemical reaction of at least a portion of the reactive groups of the components of the coating composition occurs to form a thermoset or crosslinked coating. The coated substrate may be heated to a temperature ranging from 160° F. to 450° F. (71.1° C. to 232.2° C.), such as from 200° F. to 300° F. (93.3° C. to 148.9° C.), such as from 200° F. to 250° F. (93.3° C. to 121.1° C.). The curing time may be dependent upon the curing temperature as well as other variables, for example, film thickness of the electrodeposited coating, level and type of catalyst present in the composition and the like. For purposes of the present invention, all that is necessary is that the time be sufficient to effect cure of the coating on the substrate, such as determined by the Double Acetone Rub Test Method described herein. For example, the curing time may range from 10 to 60 minutes, such as 20 to 40 minutes. The thickness of the resultant cured electrodeposited coating may range from 1 to 50 microns, such as 15 to 50 microns.

According to the present invention, the coating deposited from the resinous dispersion describe above may cure at a bake temperature of 250° F. in 60 minutes or less, as measured by the Double Acetone Rub Test Method.

As used herein, the "Double Acetone Rub Test Method" refers to rubbing the baked panels with an acetone soaked WYPALL X80 disposable paper wipe manufactured by Kimberly-Clark. The number of double acetone rub(s) (one rub forward and rub backward constitutes a double rub) are counted until the coating is removed and the metal substrate is exposed, or until a predetermined number of rubs is reached without exposing the underlying substrate surface. A coating may be considered to be cured if it survives at least 25 double acetone rubs without reaching the substrate; such as at least 50 double acetone rubs without reaching the substrate; such as at least 75 double acetone rubs without reaching the substrate; such as at least 100 double acetone rubs without reaching the substrate.

The aqueous resinous dispersion may be electrophoretically deposited upon any electrically conductive substrate. Suitable substrates include metal substrates, metal alloy substrates, and/or substrates that have been metallized, such as nickel-plated plastic. Additionally, substrates may comprise non-metal conductive materials including composite materials such as, for example, materials comprising carbon fibers or conductive carbon. According to the present invention, the metal or metal alloy may comprise, for example, cold rolled steel, hot rolled steel, steel coated with zinc metal, zinc compounds, or zinc alloys, such as electrogalvanized steel, hot-dipped galvanized steel, galvannealed steel, nickel-plated steel, and steel plated with zinc alloy. The substrate may comprise an aluminum alloy. Non-limiting examples of aluminum alloys include the 1XXX, 2XXX, 3XXX, 4XXX, 5XXX, 6XXX, or 7XXX series as well as clad aluminum alloys and cast aluminum alloys, such as, for example, the A356 series. The substrate may comprise a magnesium alloy. Non-limiting examples of magnesium alloys of the AZ31B, AZ91C, AM60B, or EV31A series also may be used as the substrate. The substrate used in the present invention may also comprise other suitable non-ferrous metals such as titanium or copper, as well as alloys of these materials. Suitable metal substrates for use in the present invention include those that are often used in the assembly of vehicular bodies (e.g., without limitation, door, body panel, trunk deck lid, roof panel, hood, roof and/or stringers, rivets, landing gear components, and/or skins used on an aircraft), a vehicular frame, vehicular parts, motorcycles, wheels, industrial structures and components such as appliances, including washers, dryers, refrigerators, stoves, dishwashers, and the like, agricultural equipment, lawn and garden equipment, air conditioning units, heat pump units, lawn furniture, and other articles. The substrate may comprise a vehicle or a portion or part thereof. The term "vehicle" is used in its broadest sense and includes all types of aircraft, spacecraft, watercraft, and ground vehicles. For example, a vehicle can include, aircraft such as airplanes including private aircraft, and small, medium, or large commercial passenger, freight, and military aircraft; helicopters, including private, commercial, and military helicopters; aerospace vehicles including, rockets and other spacecraft. A vehicle can include a ground vehicle such as, for example, trailers, cars, trucks, buses, vans, construction vehicles, golf carts, motorcycles, bicycles, trains, and railroad cars. A vehicle can also include watercraft such as, for example, ships, boats, and hovercraft. The aqueous resinous dispersion may be utilized to coat surfaces and parts thereof. A part may include multiple surfaces. A part may include a portion of a larger part, assembly, or apparatus. A portion of a part may be coated with the aqueous resinous dispersion of the present invention or the entire part may be coated.

The metal substrate may be in the shape of a cylinder, such as a pipe, including, for example, a cast iron pipe. The metal substrate also may be in the form of, for example, a sheet of metal or a fabricated part. The substrate may also comprise conductive or non-conductive substrates at least partially coated with a conductive coating. The conductive coating may comprise a conductive agent such as, for example, graphene, conductive carbon black, conductive polymers, or conductive additives. It will also be understood that the substrate may be pretreated with a pretreatment solution. Non-limiting examples of a pretreatment solution include a zinc phosphate pretreatment solution such as, for example, those described in U.S. Pat. Nos. 4,793,867 and 5,588,989, a zirconium containing pretreatment solution such as, for example, those described in U.S. Pat. Nos. 7,749,368 and 8,673,091. Other non-limiting examples of a pretreatment solution include those comprising trivalent chromium, hexavalent chromium, lithium salts, permanganate, rare earth metals, such as yttrium, or lanthanides, such as cerium. Another non-limiting example of a suitable surface pretreatment solution is a solgel, such as those comprising alkoxy-silanes, alkoxy-zirconates, and/or alkoxy-titanates. Alternatively, the substrate may be a non-pretreated substrate, such as a bare substrate, that is not pretreated by a pretreatment solution.

The substrate may optionally be subjected to other treatments prior to coating. For example, the substrate may be cleaned, cleaned and deoxidized, anodized, acid pickled, plasma treated, laser treated, or ion vapor deposition (IVD) treated. These optional treatments may be used on their own or in combination with a pretreatment solution. The substrate may be new (i.e., newly constructed or fabricated) or it may be refurbished, such as, for example, in the case of refinishing or repairing a component of an automobile or aircraft.

As mentioned above, the substrate coated by the aqueous resinous dispersion of the present invention may comprise a vehicle. For example, the aqueous resinous dispersion of the present invention may be utilized in coating a F/A-18 jet or related aircraft such as the F/A-18E Super Hornet and F/A-18F (produced by McDonnell Douglas/Boeing and Northrop); in coating the Boeing 787 Dreamliner, 737, 747, 717 passenger jet aircraft, and related aircraft (produced by Boeing Commercial Airplanes); in coating the V-22 Osprey; VH-92, S-92, and related aircraft (produced by NAVAIR and Sikorsky); in coating the G650, G600, G550, G500, G450, and related aircraft (produced by Gulfstream); and in coating the A350, A320, A330, and related aircraft (produced by Airbus). The aqueous resinous dispersion may be used as a coating for use in any suitable commercial, military, or general aviation aircraft such as, for example, those produced by Bombardier Inc. and/or Bombardier Aerospace such as the Canadair Regional Jet (CRJ) and related aircraft; produced by Lockheed Martin such as the F-22 Raptor, the F-35 Lightning, and related aircraft; produced by Northrop Grumman such as the B-2 Spirit and related aircraft; produced by Pilatus Aircraft Ltd.; produced by Eclipse Aviation Corporation; or produced by Eclipse Aerospace (Kestrel Aircraft).

The aqueous resinous dispersion may also be used to coat surfaces of vehicles. Non-limiting examples thereof include fuel tank surfaces and other surfaces exposed to or potentially exposed to aerospace solvents, aerospace hydraulic fluids, and aerospace fuels.

The aqueous resinous dispersion of the present invention may be utilized in an electrocoating layer that is part of a multi-layer coating composite comprising a substrate with various coating layers. The coating layers may optionally include a pretreatment layer, such as a phosphate layer (e.g., zinc phosphate layer) or metal oxide layer (e.g., zirconium oxide layer), an electrocoating layer which results from the aqueous resinous dispersion of the present invention, optionally one or more primer layer(s) and suitable topcoat layer(s) (e.g., base coat, clear coat layer, pigmented monocoat, and color-plus-clear composite compositions). It is understood that suitable additional coating layers include any of those known in the art, and each independently may be waterborne, solventborne, in solid particulate form (i.e., a powder coating composition), or in the form of a powder slurry. The additional coating compositions may comprise a film-forming polymer, crosslinking material and, if a colored base coat or monocoat, one or more pigments. The primer layer(s) may optionally be disposed between the electrocoating layer and the topcoat layer(s). Alternatively, the topcoat layer(s) may be omitted such that the composite comprises the electrocoating layer and one or more primer layer(s).

Moreover, the topcoat layer(s) may be applied directly onto the electrodepositable coating layer. In other words, the substrate may lack a primer layer such that the composite comprises the electrocoating layer and one or more topcoat layer(s). For example, a basecoat layer may be applied directly onto at least a portion of the electrodepositable coating layer.

It will also be understood that any of the topcoat layers may be applied onto an underlying layer despite the fact that the underlying layer has not been fully cured. For example, a clearcoat layer may be applied onto a basecoat layer even though the basecoat layer has not been subjected to a curing step (wet-on-wet). Both layers may then be cured during a subsequent curing step thereby eliminating the need to cure the basecoat layer and the clearcoat layer separately.

According to the present invention, additional ingredients such as colorants and fillers may be present in the various coating compositions from which the top coat layers result. Any suitable colorants and fillers may be used. For example, the colorant may be added to the coating in any suitable form, such as discrete particles, dispersions, solutions and/or flakes. A single colorant or a mixture of two or more colorants can be used in the coatings of the present invention. It should be noted that, in general, the colorant can be present in a layer of the multi-layer composite in any amount sufficient to impart the desired property, visual and/or color effect.

Example colorants include pigments, dyes and tints, such as those used in the paint industry and/or listed in the Dry Color Manufacturers Association (DCMA), as well as special effect compositions. A colorant may include, for example, a finely divided solid powder that is insoluble but wettable under the conditions of use. A colorant may be organic or inorganic and may be agglomerated or non-agglomerated. Colorants may be incorporated into the coatings by grinding or simple mixing. Colorants may be incorporated by grinding into the coating by use of a grind vehicle, such as an acrylic grind vehicle, the use of which will be familiar to one skilled in the art.

Example pigments and/or pigment compositions include, but are not limited to, carbazole dioxazine crude pigment, azo, monoazo, disazo, naphthol AS, salt type (lakes), benzimidazolone, condensation, metal complex, isoindolinone, isoindoline and polycyclic phthalocyanine, quinacridone, perylene, perinone, diketopyrrolo pyrrole, thioindigo, anthraquinone, indanthrone, anthrapyrimidine, flavanthrone, pyranthrone, anthanthrone, dioxazine, triarylcarbonium, quinophthalone pigments, diketo pyrrolo pyrrole red ("DPP red BO"), titanium dioxide, carbon black, zinc oxide, antimony oxide, etc. and organic or inorganic UV opacifying pigments such as iron oxide, transparent red or yellow iron oxide, phthalocyanine blue and mixtures thereof. The terms "pigment" and "colored filler" can be used interchangeably.

Example dyes include, but are not limited to, those that are solvent and/or aqueous based such as acid dyes, azoic dyes, basic dyes, direct dyes, disperse dyes, reactive dyes, solvent dyes, sulfur dyes, mordant dyes, for example, bismuth vanadate, anthraquinone, perylene, aluminum, quinacridone, thiazole, thiazine, azo, indigoid, nitro, nitroso, oxazine, phthalocyanine, quinoline, stilbene, and triphenyl methane.

Example tints include, but are not limited to, pigments dispersed in water-based or water miscible carriers such as AQUA-CHEM 896 commercially available from Degussa, Inc., CHARISMA COLORANTS and MAXITONER INDUSTRIAL COLORANTS commercially available from Accurate Dispersions division of Eastman Chemical, Inc.

The colorant may be in the form of a dispersion including, but not limited to, a nanoparticle dispersion. Nanoparticle dispersions can include one or more highly dispersed nanoparticle colorants and/or colorant particles that produce a desired visible color and/or opacity and/or visual effect. Nanoparticle dispersions may include colorants such as pigments or dyes having a particle size of less than 150 nm, such as less than 70 nm, or less than 30 nm. Nanoparticles may be produced by milling stock organic or inorganic pigments with grinding media having a particle size of less than 0.5 mm. Example nanoparticle dispersions and methods for making them are identified in U.S. Pat. No. 6,875,800 B2, which is incorporated herein by reference. Nanoparticle dispersions may also be produced by crystallization, precipitation, gas phase condensation, and chemical attrition (i.e., partial dissolution). In order to minimize re-agglomeration of nanoparticles within the coating, a dispersion of resin-coated nanoparticles may be used. As used herein, a "dispersion of resin-coated nanoparticles" refers to a continuous phase in which is dispersed discreet "composite microparticles" that comprise a nanoparticle and a resin coating on the nanoparticle. Example dispersions of resin-coated nanoparticles and methods for making them are identified in U.S. application Ser. No. 10/876,031 filed Jun. 24, 2004, which is incorporated herein by reference, and U.S. Provisional Application No. 60/482,167 filed Jun. 24, 2003, which is also incorporated herein by reference.

According to the present invention, special effect compositions that may be used in one or more layers of the multi-layer coating composite include pigments and/or compositions that produce one or more appearance effects such as reflectance, pearlescence, metallic sheen, phosphorescence, fluorescence, photochromism, photosensitivity, thermochromism, mechanochromism (strain sensitive pigmentation), goniochromism and/or color-change. Additional special effect compositions may provide other perceptible properties, such as reflectivity, opacity or texture. For example, special effect compositions may produce a color shift, such that the color of the coating changes when the coating is viewed at different angles. Example color effect compositions are identified in U.S. Pat. No. 6,894,086, incorporated herein by reference. Additional color effect compositions may include transparent coated mica and/or synthetic mica, coated silica, coated alumina, a transparent liquid crystal pigment, a liquid crystal coating, and/or any composition wherein interference results from a refractive index differential within the material and not because of the refractive index differential between the surface of the material and the air.

According to the present invention, a photosensitive composition and/or photochromic composition, which reversibly alters its color when exposed to one or more light sources, can be used in a number of layers in the multi-layer composite. Photochromic and/or photosensitive compositions can be activated by exposure to radiation of a specified wavelength. When the composition becomes excited, the molecular structure is changed and the altered structure exhibits a new color that is different from the original color of the composition. When the exposure to radiation is removed, the photochromic and/or photosensitive composition can return to a state of rest, in which the original color of the composition returns. For example, the photochromic and/or photosensitive composition may be colorless in a non-excited state and exhibit a color in an excited state. Full color-change may appear within milliseconds to several minutes, such as from 20 seconds to 60 seconds. Example photochromic and/or photosensitive compositions include photochromic dyes.

The photosensitive composition and/or photochromic composition may be associated with and/or at least partially bound to, such as by covalent bonding, a polymer and/or polymeric materials of a polymerizable component. In contrast to some coatings in which the photosensitive composition may migrate out of the coating and crystallize into the substrate, the photosensitive composition and/or photochromic composition associated with and/or at least partially bound to a polymer and/or polymerizable component in accordance with the present invention, have minimal migration out of the coating. Example photosensitive compositions and/or photochromic compositions and methods for making them are identified in U.S. application Ser. No. 10/892,919 filed Jul. 16, 2004 and incorporated herein by reference.

The primer and/or topcoat layer(s) may optionally further comprise corrosion inhibitors. The corrosion inhibitors may comprise any of the corrosion inhibitors discussed above with respect to the aqueous resinous dispersion, and may further comprise magnesium oxide, magnesium hydroxide, lithium salts, and/or lithium silicates.

According to the present invention, the aqueous resinous dispersion and/or layers deposited from the same, as well as any pretreatment layer, primer layer or topcoat layer, may be substantially free, essentially free, or completely free of chromium or chromium-containing compounds. As used herein, the term "chromium-containing compound" refers to materials that include trivalent chromium or hexavalent chromium. Non-limiting examples of such materials include chromic acid, chromium trioxide, chromic acid anhydride, dichromate salts, such as ammonium dichromate, sodium dichromate, potassium dichromate, and calcium, barium, magnesium, zinc, cadmium, and strontium dichromate. When the aqueous resinous dispersion and/or layers deposited from the same, as well as any pretreatment layer, primer layer or topcoat layer, is substantially free, essentially free, or completely free of chromium, this includes chromium in any form, such as, but not limited to, the trivalent chromium-containing compounds and hexavalent chromium-containing compounds listed above.

An aqueous resinous dispersion and/or layers deposited from the same, as well as any pretreatment layer, primer layer or topcoat layer, that is substantially free of chromium or chromium-containing compounds means that chromium or chromium-containing compounds are not intentionally added, but may be present in trace amounts, such as because of impurities or unavoidable contamination from the environment. In other words, the amount of material is so small that it does not affect the properties of the composition; this may further include that chromium or chromium-containing compounds are not present in the aqueous resinous dispersion and/or layers deposited from the same, as well as any pretreatment layer, primer layer or topcoat layer, in such a level that they cause a burden on the environment. The term "substantially free" means that the aqueous resinous dispersion and/or layers deposited from the same, as well as any pretreatment layer, primer layer or topcoat layer, contain less than 10 ppm of chromium, based on total solids weight of the composition, the layer, or the layers, respectively, if any at all. The term "essentially free" means that the aqueous resinous dispersion and/or layers deposited from the same, as well as any pretreatment layer, primer layer or topcoat layer, contain less than 1 ppm of chromium, based on total solids weight of the composition or the layer, or layers, respectively, if any at all. The term "completely free" means that the aqueous resinous dispersion and/or layers comprising the same, as well as any pretreatment layer, primer layer or topcoat layer, contain less than 1 ppb of chromium, based on total solids weight of the composition, the layer, or the layers, respectively, if any at all.

According to the present invention, the coating deposited from the aqueous resinous dispersion describe above may be hydrolytically stable, as determined by the Hydrolytic Stability Test Method. As used herein, the "Hydrolytic Stability Test Method" refers to immersing a baked panel in deionized water at a temperature of 90° C. for 24 hours. The panel is then removed and baked in an oven set to 150° F. for 60 minutes to dehydrate the coating film. The panel is then retested for cure according to the Double Acetone Rub Test Method. Whether a coating is considered to be hydrolytically stable is demonstrated by the ability of the coating to retain acetone resistance after being subjected to the water soak compared to the acetone resistance of the coating without the water soak. Specifically, the number of double acetone rubs that the coating survived following the water soak is compared to the number of double acetone rubs the coating survived without exposure to the water soak. A coating is considered to be "hydrolytically stable" if the coating survived a number of double acetone rubs following exposure to the water soak without reaching the underlying substrate equal to at least 60% of the double acetone rubs that the coating was able to survive without exposure to the water soak, with the caveat that if the cured coating survived 100 or more double acetone rubs without exposure to the water soak, then the cured coating was considered to be hydrolytically stable if the coating survived at least 60 double acetone rubs without reaching the substrate. For example, a coating that survived 50 double acetone rubs without exposure to the water soak was considered to be hydrolytically stable if it survived at least 30 double acetone rubs following exposure to the water soak. Although reference is made to the coating prior to exposure to the water soak and after exposure to the water soak, it should be understood that two different coated panels are used with each panel having been coated by the same composition by the same technique and cured under the same conditions (i.e., same oven, oven temperature and baking time).

It has been surprisingly discovered that use of the phosphated epoxy resin and aqueous resinous dispersion of the present invention results in a cured coating that is hydrolytically stable. Without intending to be bound by any theory, it is believed that the carbamate functional group of the phosphated epoxy resin forms bonds with curing agents that are not substantially susceptible to hydrolytic attack.

The present invention is also directed towards a coated substrate, wherein the coated substrate is at least partially coated with the aqueous resinous dispersion described above. The present invention includes parts coated with an aqueous resinous dispersion of the present invention, and assemblies and apparatus comprising a part coated with an aqueous resinous dispersion of the present invention.

The present invention includes vehicles comprising a part such as a surface coated with the aqueous resinous dispersion of the present invention. For example, an aircraft comprising a fuel tank or portion of a fuel tank coated with the aqueous resinous dispersion of the present invention is included within the scope of the invention. The coating may be in an at least partially cured or fully cured state.

As used herein, the "resin solids" include the phosphated epoxy resin, the curing agent, the carbamate-functional oligomer (if present) and any additional water-dispersible non-pigmented component(s) present in the composition.

As used herein, the term "alkyl" refers to a substituted or unsubstituted hydrocarbon chain that may be linear or branched and may comprise one or more hydrocarbon rings that are not aromatic. As used herein, "aryl" refers to a substituted or unsubstituted hydrocarbon having a delocalized conjugated π-system with alternating double and single bonds between carbon atoms forming one or more coplanar hydrocarbon rings.

For purposes of the detailed description, it is to be understood that the invention may assume various alternative variations and step sequences, except where expressly specified to the contrary. Moreover, other than in any operating examples, or where otherwise indicated, all numbers such as those expressing values, amounts, percentages, ranges, subranges and fractions may be read as if prefaced by the word "about," even if the term does not expressly appear. Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques. Where a closed or open-ended numerical range is described herein, all numbers, values, amounts, percentages, subranges and fractions within or encompassed by the numerical range are to be considered as being specifically included in and belonging to the original disclosure of this application as if these numbers, values, amounts, percentages, subranges and fractions had been explicitly written out in their entirety.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

As used herein, unless indicated otherwise, a plural term can encompass its singular counterpart and vice versa, unless indicated otherwise. For example, although reference is made herein to "an" epoxy resin, "a" carbamate functional group, and "a" curing agent, a combination (i.e., a plurality) of these components can be used. In addition, in this application, the use of "or" means "and/or" unless specifically stated otherwise, even though "and/or" may be explicitly used in certain instances.

As used herein, "including," "containing" and like terms are understood in the context of this application to be synonymous with "comprising" and are therefore open-ended and do not exclude the presence of additional undescribed or unrecited elements, materials, ingredients or method steps. As used herein, "consisting of" is understood in the context of this application to exclude the presence of any unspecified element, ingredient or method step. As used herein, "consisting essentially of" is understood in the context of this application to include the specified elements, materials, ingredients or method steps "and those that do not materially affect the basic and novel characteristic(s)" of what is being described.

As used herein, the terms "on," "onto," "applied on," "applied onto," "formed on," "deposited on," "deposited onto," mean formed, overlaid, deposited, or provided on but not necessarily in contact with the surface. For example, an electrodepositable coating composition "deposited onto" a substrate does not preclude the presence of one or more other intervening coating layers of the same or different composition located between the electrodepositable coating composition and the substrate.

Whereas specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the claims appended and any and all equivalents thereof.

ASPECTS

Aspect 1. A phosphated epoxy resin comprising:

at least one terminal group comprising a phosphorous atom covalently bonded to the resin by a carbon-phosphorous bond or by a phosphoester linkage; and at least one carbamate functional group.

Aspect 2. The phosphated epoxy resin of Aspect 1, wherein the terminal group comprises phosphate, organophosphate, phosphonate, organophosphonate, phosphinate, organophosphinate, or combinations thereof.

Aspect 3. The phosphated epoxy resin of any of the preceding Aspects, wherein the phosphated epoxy resin is substantially free of pendent groups comprising a phosphorous atom covalently bonded to the resin by a carbon-phosphorous bond or by a phosphoester linkage.

Aspect 4. The phosphated epoxy resin of any of the preceding Aspects, wherein the terminal group of the phosphated epoxy resin comprises the structure:

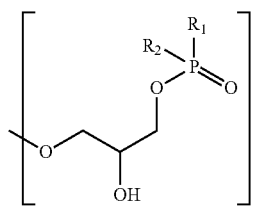

wherein $R_1$ and $R_2$ each independently represent hydrogen, hydroxyl, an alkyl radical, an aryl radical, or a phosphoester group.

Aspect 5. The phosphated epoxy resin of any of the preceding Aspects, wherein the phosphated epoxy resin comprises at least one pendent group comprising the carbamate functional group, the pendent group comprising the structure:

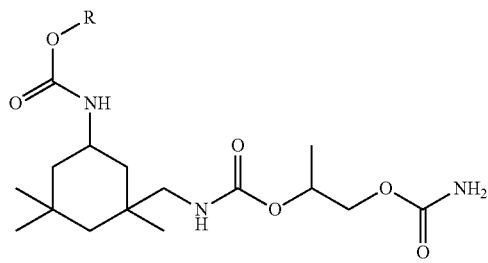

wherein R represents remainder of phosphated epoxy resin.

Aspect 6. The phosphated epoxy resin of any of the preceding Aspects, wherein the phosphated epoxy resin comprises the following structure:

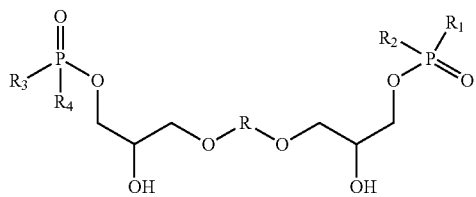

wherein $R_1$, $R_2$, $R_3$ and $R_4$ each independently represent hydrogen, hydroxyl, an alkyl radical, an aryl radical, or a phosphoester group, and R represents the residue of an epoxy functional polymer comprising at least one carbamate functional group.

Aspect 7. The phosphated epoxy resin of any of the preceding Aspects, wherein the phosphated epoxy resin comprises at least one constitutional unit A comprising the structure:

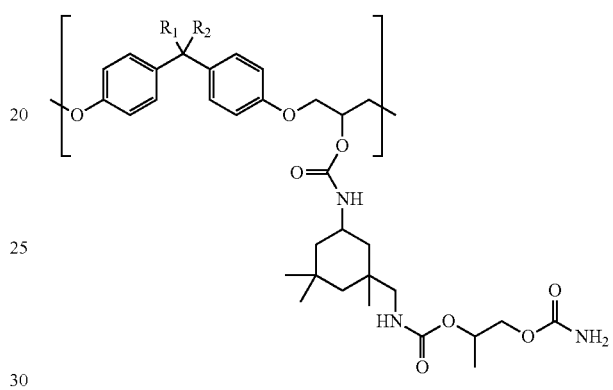

wherein $R_1$ and $R_2$ each independently represent hydrogen, an alkyl radical or an aryl radical.

Aspect 8. The phosphated epoxy resin of Aspect 7, wherein the phosphated epoxy resin further comprises at least one constitutional unit B comprising the structure:

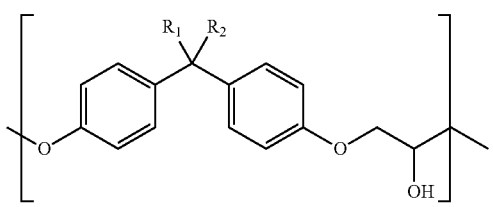

wherein $R_1$ and $R_2$ each independently represent hydrogen, an alkyl radical or an aryl radical.

Aspect 9. The phosphated epoxy resin of Aspect 8, wherein the ratio of constitutional unit A to constitutional unit B is from 1:20 to 20:1.

Aspect 10. The epoxy resin of any of Aspects 1-7, wherein the phosphated epoxy resin comprises the structure:

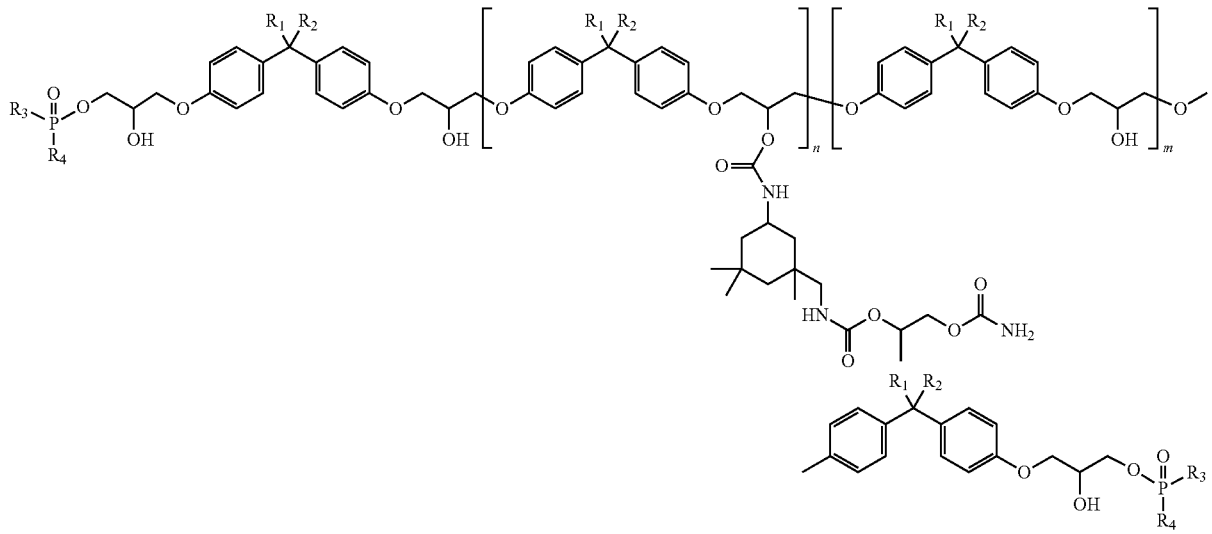

wherein m is 1 to 2,000 and n is 0 to 2,000; d $R_2$ each independently represent hydrogen, an alkyl radical or an aryl radical; $R_3$ and $R_4$ each independently represent hydrogen, hydroxyl, an alkyl radical, an aryl radical, or a phosphoester group.

Aspect 11. An aqueous resinous dispersion comprising:
(a) the phosphated epoxy resin according to any of Aspects 1-10; and
(b) a curing agent.

Aspect 12. The aqueous resinous dispersion of Aspect 11, wherein the curing agent comprises at least two functional groups reactive with carbamate functional groups.

Aspect 13. The aqueous resinous dispersion of any of Aspects 11 or 12, wherein the curing agent comprises an aminoplast resin, a phenoplast resin, a blocked polyisocyanate, or combinations thereof.

Aspect 14. The aqueous resinous dispersion of any of Aspects 11-13, wherein the resinous dispersion is substantially free of metal-containing catalysts.

Aspect 15. The aqueous resinous dispersion of any of Aspects 11-14, further comprising a carbamate-functional oligomer comprising at least two carbamate groups.

Aspect 16. The aqueous resinous dispersion of Aspect 15, wherein the carbamate-functional oligomer comprises the structure:

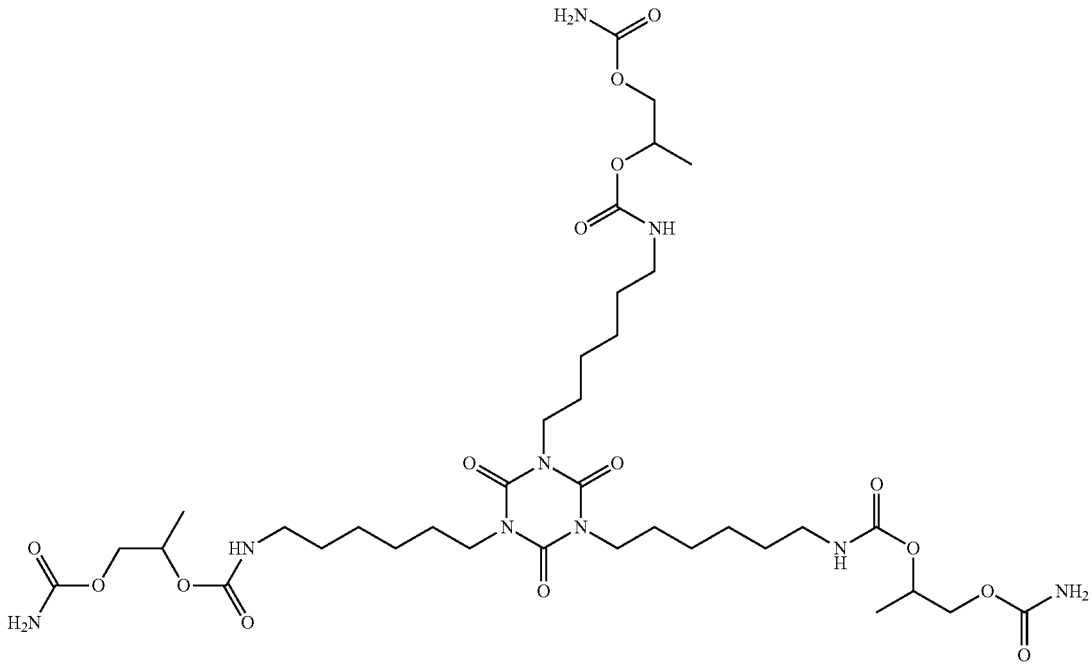 [SMILES: CC(COC(N)=O)OC(=O)NCCCCCCn1c(=O)n(CCCCCCNC(=O)OC(C)COC(N)=O)c(=O)n(CCCCCCNC(=O)OC(C)COC(N)=O)c1=O]

Aspect 17. A method of making the phosphated epoxy resin of any of Aspects 1-10, the method comprising:

reacting an epoxy resin comprising at least one terminal epoxide functional group and at least one pendant hydroxyl functional group with a molecule comprising an isocyanato functional group and a carbamate functional group, wherein the pendant hydroxyl functional group and isocyanato functional group react to form a urethane linkage, whereby the molecule is incorporated into the epoxy resin to form a carbamate-functional epoxy resin; and further reacting the carbamate-functional epoxy resin with a phosphoric acid, a phosphonic acid, a phosphinic acid, or combinations thereof, wherein the at least one terminal epoxide functional group of the carbamate-functional epoxy resin reacts with an acid group of the phosphoric acid or phosphonic acid, whereby the phosphoric acid, the phosphonic acid, and/or the phosphinic acid is incorporated into the carbamate-functional epoxy resin to form a phosphated, carbamate-functional epoxy resin.

Aspect 18. The method of Aspect 17, wherein the phosphated, carbamate-functional epoxy resin is neutralized with a base.

Aspect 19. A method of coating a substrate, comprising electrophoretically depositing the aqueous resinous dispersion of any of Aspects 11-16 onto the substrate to form a coating on the substrate.

Aspect 20. A coated substrate, wherein the coated substrate is at least partially coated with the resinous dispersion of any of Aspects 11-16.

Aspect 21. An aqueous resinous dispersion comprising:
(a) an epoxy resin; and
(b) a carbamate-functional oligomer comprising at least two carbamate groups.

Aspect 22. The aqueous resinous dispersion of Aspect 21, wherein the carbamate-functional oligomer comprises the structure:

Aspect 23. The aqueous resinous dispersion of Aspect 21 or 22, further comprising a curing agent.

Illustrating the invention are the following examples, which, however, are not to be considered as limiting the invention to their details. Unless otherwise indicated, all parts and percentages in the following examples, as well as throughout the specification, are by weight.

EXAMPLES

Example 1—Preparation of an Aqueous Resinous Dispersion of a Hydroxyl-Functional Phosphated Epoxy Resin Example 1A A general procedure for making an aqueous resinous dispersion of a hydroxyl-functional phosphated epoxy resin was performed as follows:

| Charge # | Material | Amount (g) |
|---|---|---|
| 1 | Bisphenol-A Diglycidyl Ether | 141.4 |
| 2 | Bisphenol-A | 45.5 |
| 3 | Butyl CELLOSOLVE[1] | 14.1 |
| 4 | 2-Ethyl-1-hexanol | 21.2 |
| 5 | Ethyltriphenylphosphonium Bromide | 0.1 |
| 6 | Ektasolve EEH[2] | 20.5 |
| 7 | 85% Phosphoric Acid | 5.5 |
| 8 | Phenylphosphonic Acid | 3.3 |
| 9 | Ektasolve EEH | 0.9 |
| 10 | Deionized water | 9.6 |
| 11 | Diisopropanolamine | 15.6 |
| 12 | Cymel 1130[3] | 70.2 |

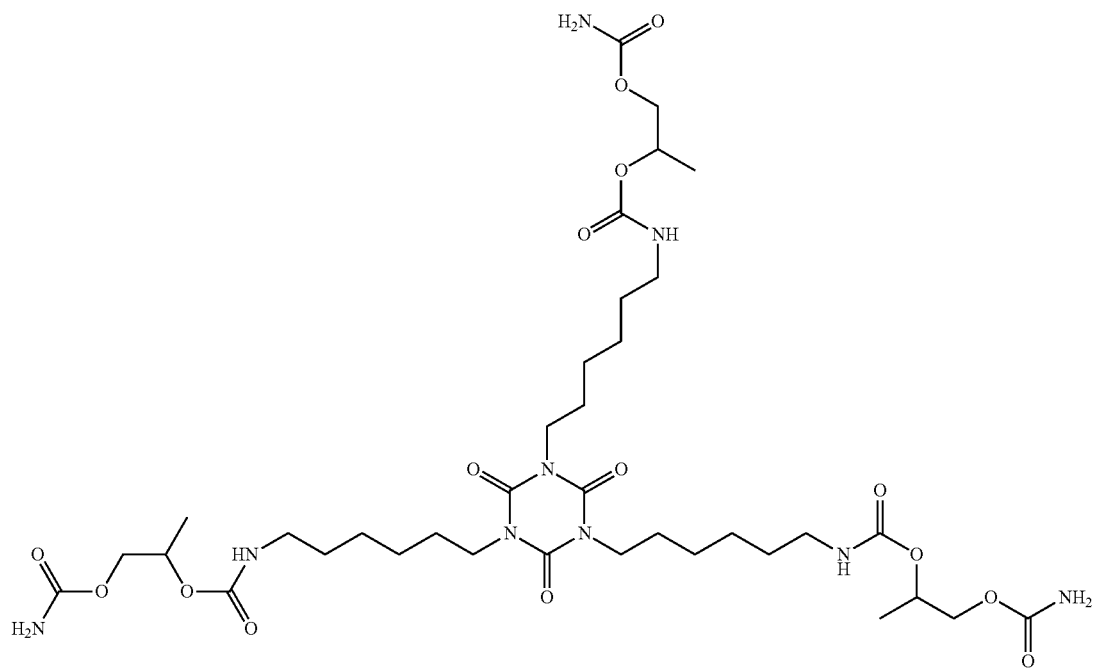 [SMILES: CC(COC(N)=O)OC(=O)NCCCCCCn1c(=O)n(CCCCCCNC(=O)OC(C)COC(N)=O)c(=O)n(CCCCCCNC(=O)OC(C)COC(N)=O)c1=O]

-continued

| Charge # | Material | Amount (g) |
|---|---|---|
| 13 | Deionized water | 138.1 |
| 14 | Deionized water | 247.8 |

[1]2-Butoxyethanol available from Dow Chemical Company
[2]Ethylene glycol 2-ethylhexyl ether available from Eastman Chemical Company
[3]Cymel 1130 a methylated/n-butylated melamine-formaldehyde crosslinker available from Allnex (98% ± 2% non-volatile content)

Charges 1-5 were added to a flask set up for total reflux with stirring under nitrogen and heated to 130° C. and allowed to exotherm to 160° C. The mixture was held at 160° C. for 1 hour. After 1 hour, charge 6 was added while cooling to 90° C. When 90° C. was reached, charges 7-9 were added and the mixture was allowed to exotherm. The temperature was adjusted to 120° C. and the mixture was held at that temperature for 30 minutes, then cooled to 100° C. Charge 10 was added slowly and the mixture was held at 100° C. for 1 hour, then cooled to 90° C. Charge 11 was added followed by charge 12. The mixture was stirred for 30 minutes as the temperature was readjusted to 90° C. The resulting mixture was then reverse thinned into charge 13, which was at ambient temperature, and held for 30 minutes. Charge 14 was then added and held for 30 minutes. The total solids of the aqueous resinous dispersion was 35.1% solids. Final molecular weight of the phosphated epoxy resin as determined by GPC (Mz) was 253,961.

Example 1B

The hydroxyl-functional phosphated epoxy resin of Example 1A was formulated into a paint using the following procedure:

| Charge # | Material | Amount (g) |
|---|---|---|
| 1 | Aqueous resinous dispersion of Example 1A | 1200.7 |
| 2 | ACPP2220[1] | 239.0 |
| 3 | Deionized water | 1360.3 |

[1]Commercially available pigment paste available from PPG Industries, Inc.

Charge 1 was added to a 1-gallon plastic bucket and agitation was started. Charge 2 was added slowly over 5 minutes. Finally, charge 3 was added over 5 minutes and the resulting mixture stirred for an additional 15 minutes.

After ultrafiltration, the paint was electrodeposited (130V/90s/75° F./) onto 2024 T3 aluminum panel with the aluminum panel serving as the anode and baked in an oven set to a temperature of 250° F. for 30 minutes. The panels were prepared as follows prior to electrocoating for each example included herein: The 2024 T3 aluminum alloy panels were wiped clean using an acetone-soaked wipe and were then immersed in RIDOLENE 298 (an alkaline cleaner commercially available from Henkel Corp.) for 2 minutes at 130° F. (54.4° C.) followed by a 1-minute immersion in tap water. The panels were then immersed in TURCO 6/16 deoxidizer bath (commercially available from Henkel Corp. and prepared according to manufacturer instructions) at ambient conditions for 2.5 minutes, followed by a 1-minute immersion in tap water. The panels were then spray rinsed with deionized water and allowed to dry under ambient conditions for 1-2 hours prior to electrocoating application.

The baked substrate was tested for cure according to the Double Acetone Rub Test Method. The coating of Example 1B passed the Double Acetone Rub Test Method by surviving 100 double acetone rubs (DAR) without reaching the underlying substrate.

The baked panel was also tested for the presence of filiform corrosion according to the Filiform Corrosion Test Method. Filiform corrosion was present in the form of filaments measuring 1 mm.

The baked panel was also evaluated for hydrolytic stability according to the Hydrolytic Stability Test Method. The film was determined to lack hydrolytic stability as measured according to the Hydrolytic Stability Test Method because the rubbing wore through the coating to expose the underlying substrate after only 4 double acetone rubs.

Example 2—Preparation of a Carbamate-Functional Oligomer

A reaction schematic and general procedure for making a carbamate-functional oligomer (hydroxypropylcarbamate fully-capped hexamethylene diisocyanate trimer) was performed as follows:

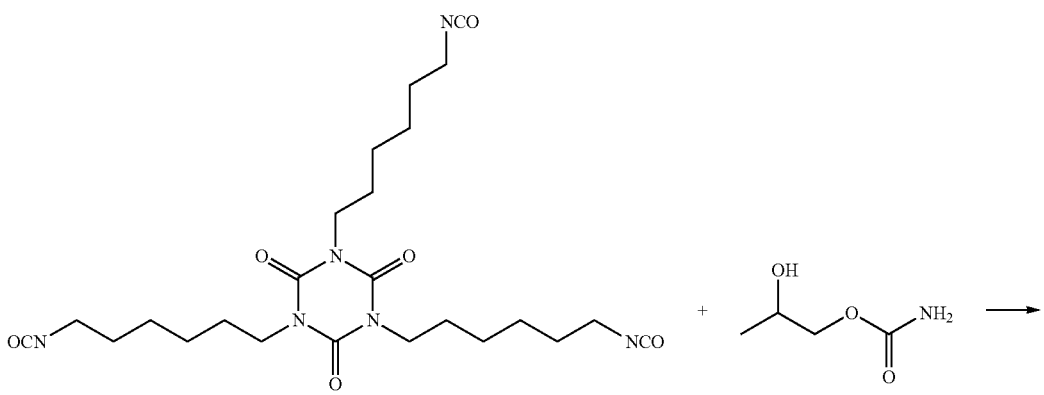

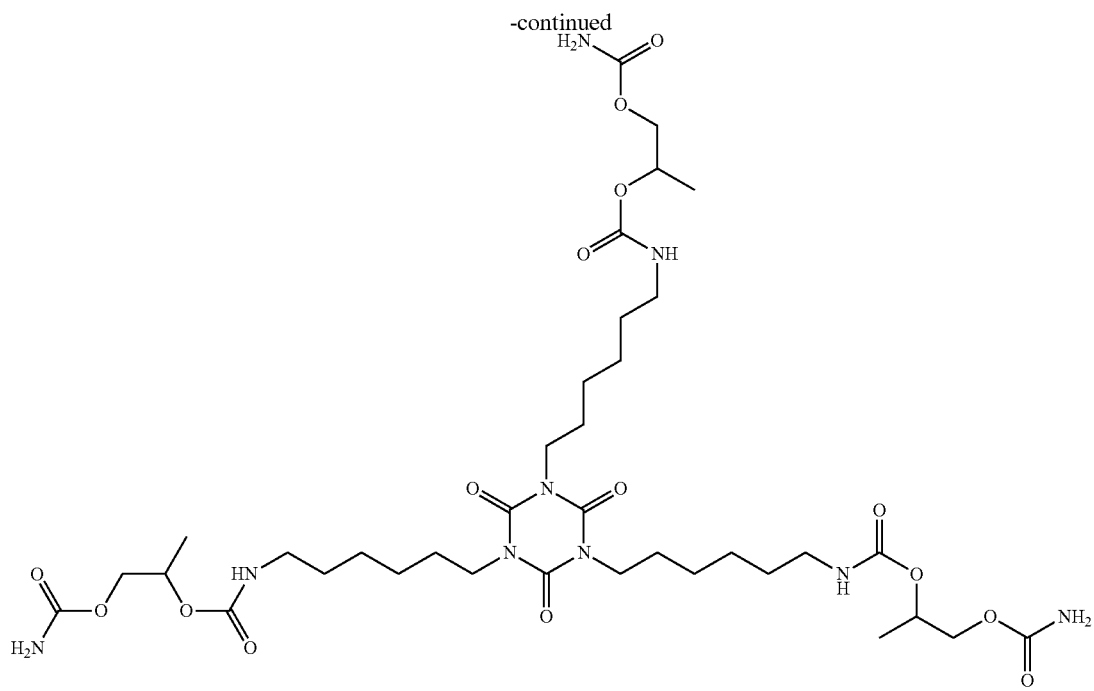

| Chare # | Material | Amount (g) |
|---|---|---|
| 1 | Hexamethylene Diisocyanate Trimer[1] | 970.0 |
| 2 | Methyl isobutyl ketone | 362.4 |
| 3 | Dibutyltindilaurate | 1.6 |
| 4 | Carbalink HPC (95% solids)[2] | 639.4 |

[1]Available as Desmodur N 3300 from Covestro
[2]Hydroxypropylcarbamate commercially available from Huntsman Charges 1-3 were added to a flask set up for total reflux with stirring under nitrogen. The mixture was heated to a temperature of 60° C. Charge 4 was added over 2 hours through an addition funnel while the resulting exotherm was maintained under 60° C. After 2 hours, the mixture revealed no residual isocyanate peak by IR (2200-2300 cm$^{-1}$). The mixture was then cooled to 40° C. and poured out. Final solids were 84.2%. Final molecular weight as determined by GPC (Mz) was 2,999.

Example 3—Preparation of an Aqueous Resinous Dispersion of a Hydroxyl-Functional Phosphated Epoxy Resin and Carbamate-Functional Oligomer Example 3A A general procedure for making an aqueous resinous dispersion of a hydroxyl-functional phosphated epoxy resin and the carbamate-functional oligomer of Example 2 was performed as follows:

| Charge # | Material | Amount (g) |
|---|---|---|
| 1 | Bisphenol-A Diglycidyl Ether | 184.4 |
| 2 | Bisphenol-A | 59.4 |
| 3 | Butyl carbitol formal | 7.5 |
| 4 | Ethyltriphenylphosphonium Bromide | 0.2 |
| 5 | Methyl isobutyl ketone | 19.5 |
| 6 | Ektasolve EEH | 41.4 |
| 7 | Butyl CELLOSOLVE | 37.3 |
| 8 | 2-Ethyl-1-hexanol | 49.7 |
| 9 | 85% Phosphoric Acid | 14.6 |
| 10 | Phenylphosphonic Acid | 12.7 |
| 11 | Ektasolve EEH | 4.1 |
| 12 | Deionized water | 31.0 |
| 13 | Diisopropanolamine | 49.6 |
| 14 | Cymel 1130 | 106.2 |
| 15 | Carbamate functional oligomer of Example 2 | 336.3 |
| 16 | Deionized water | 358.6 |
| 17 | Deionized water | 532.4 |

Charges 1-4 were added to a flask set up for total reflux with stirring under nitrogen and heated to 130° C. and allowed to exotherm to 160° C. The mixture was held at 160° C. for 1 hour. After 1 hour, charge 5 was added while cooling to 90° C. When 90° C. was reached, charges 6-8 were added followed by charges 9-11. The mixture was allowed to exotherm and the temperature was adjusted to 120° C. The mixture was held at that temperature for 30 minutes, then cooled to 100° C. Charge 12 was added slowly and the mixture was held at 100° C. for 1 hour, then cooled to 90° C. Charge 13 was added followed by charge 14, and then charge 15. The mixture was stirred for 30 minutes as the temperature was readjusted to 90° C. The resulting mixture was then reverse thinned into charge 16, which was at ambient temperature, and held for 30 minutes. Charge 17 was then added and held for 30 minutes. Final solids were 33.5%. Final molecular weight of the phosphated epoxy resin as determined by GPC (Mz) was 354,257.

Example 3B

The aqueous resinous dispersion of Example 3A was formulated into a paint using the following procedure:

| Charge # | Material | Amount (g) |
|---|---|---|
| 1 | Aqueous resinous dispersion of Example 3A | 1313.8 |
| 2 | ACPP2220 | 239.0 |
| 3 | Deionized water | 1247.2 |

Charge 1 was added to a 1-gallon plastic bucket and agitation was started. Charge 2 was added slowly over 5 minutes. Finally, charge 3 was added over 5 minutes and the resulting mixture stirred for an additional 15 minutes.

After ultrafiltration, the paint was electrodeposited (95V/90s/75° F./) onto 2024 T3 aluminum panel with the aluminum panel serving as the anode and baked in an oven set to a temperature of 250° F. for 30 minutes.

The baked substrate was tested for cure according to the Double Acetone Rub Test Method. The coating of Example 3B passed the Double Acetone Rub Test Method by surviving 100 double acetone rubs (DAR) without reaching the underlying substrate.

The baked panel was also tested for the presence of filiform corrosion according to the Filiform Corrosion Test Method. Filiform corrosion was not detected because no filaments were found along the scribed area.

Example 4—Preparation of a Molecule Carbamate-Functional Molecule

A reaction schematic and general procedure for making a carbamate-functional molecule, hydroxypropylcarbamate half-capped isophoronediisocyanate, was performed as follows:

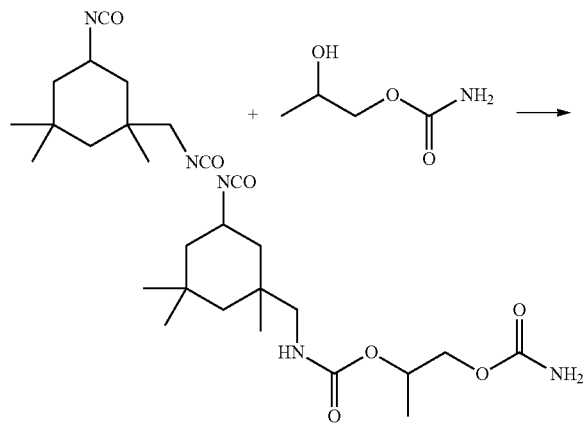

| Charge # | Material | Amount (g) |
|---|---|---|
| 1 | Isophoronediisocyanate | 889.6 |
| 2 | Methyl isobutyl ketone | 430.3 |
| 3 | Dibutyltindilaurate | 1.4 |
| 4 | Carbalink HPC (95% solids) | 501.5 |

Charges 1-3 were added to a flask set up for total reflux with stirring under nitrogen. The mixture was heated to a temperature of 60° C. Charge 4 was added over 2 hours through an addition funnel while the resulting exotherm was maintained under 70° C. After 2 hours, the mixture was titrated for isocyanate (NCO) equivalent weight and found to have a value of 490 g/eq of NCO (theoretical value determined to be 456 g/eq). The mixture was then cooled to 40° C. and poured out. Final solids were 75.8%. Final molecular weight as determined by GPC (Mz) was 585.

Example 5—Preparation of an Aqueous Resinous Dispersion of a Carbamate-Functional Phosphated Epoxy Resin

Example 5A

A general procedure for making a carbamate-functional phosphated epoxy resin was performed as follows:

| Charge # | Material | Amount (g) |
|---|---|---|
| 1 | Bisphenol-A Diglycidyl Ether | 258.2 |
| 2 | Bisphenol-A | 83.1 |
| 3 | Butyl carbitol formal | 10.6 |
| 4 | Ethyltriphenylphosphonium Bromide | 0.2 |
| 5 | Methyl isobutyl ketone | 49.7 |
| 6 | Dibutyltindilaurate | 0.5 |
| 7 | Carbamate-functional molecule of Example 4 | 157.8 |
| 8 | Ektasolve EEH | 112.7 |
| 9 | Butyl CELLOSOLVE | 87.9 |
| 10 | 2-Ethyl-1-hexanol | 72.1 |
| 11 | 85% Phosphoric Acid | 14.5 |
| 12 | Phenylphosphonic Acid | 15.8 |
| 13 | Ektasolve EEH | 27.3 |
| 14 | Deionized water | 33.8 |
| 15 | Diisopropanolamine | 54.0 |
| 16 | Cymel 1130 | 181.0 |
| 17 | Deionized water | 205.5 |
| 18 | Deionized water | 544.6 |

Charges 1-4 were added to a flask set up for total reflux with stirring under nitrogen and heated to 130° C. and allowed to exotherm to 160° C. The mixture was held at 160° C. for 1 hour. After 1 hour, charge 5 was added while cooling to 80° C. When 80° C. was reached, charge 6 was added followed by charge 7 over 1 hour. After 1 hour, residual NCO was checked by IR and none remained. The mixture was then warmed to 90° C. When 90° C. was reached, charges 8-10 were added followed by charges 11-13. The mixture was allowed to exotherm and the temperature was adjusted to 120° C. The mixture was held at that temperature for 30 minutes, then cooled to 100° C. Charge 14 was added slowly and the mixture was held at 100° C. for 1 hour, then cooled to 90° C. Charge 15 was added followed by charge 16. The mixture was stirred for 30 minutes as the temperature was readjusted to 90° C. The resulting mixture was then reverse thinned into charge 17, which was at ambient temperature, and held for 30 minutes. Charge 18 was then added and held for 30 minutes. Final solids were 36.1%. Final molecular weight as determined by GPC (Mz) was 92,585.

The phosphated epoxy resin was also tested to determine whether the carbamate-functional molecule of Example 4 was present on the phosphated epoxy resin. Electrospray ionization mass spectrometry (ESI-MS) analysis determined that by comparison to starting epoxy polymer, the mass difference of hydroxypropylcarbamate half-capped isophoronediisocyanate (341 Da) was found in the reaction product of the two, indicating that the hydroxypropylcarbamate half-capped isophoronediisocyanate was reacted onto the epoxy polymer backbone.

Example 5B

The aqueous resinous dispersion of Example 5A was formulated into a paint using the following procedure:

| Charge # | Material | Amount (g) |
|---|---|---|
| 1 | Aqueous Resinous Dispersion of Example 5A | 1216.7 |
| 2 | ACPP2220 | 239.1 |
| 3 | Deionized water | 1345.0 |

Charge 1 was added to a 1-gallon plastic bucket and agitation was started. Charge 2 was added slowly over 5 minutes. Finally, charge 3 was added over 5 minutes and the resulting mixture stirred for an additional 15 minutes.

After ultrafiltration, the paint was electrodeposited (85V/90s/75° F./) onto 2024 T3 aluminum panel with the aluminum panel serving as the anode and baked in an oven set to a temperature of 250° F. for 60 minutes.

The baked substrate was tested for cure according to the Double Acetone Rub Test Method. The coating of Example 5B passed the Double Acetone Rub Test Method by surviving 100 double acetone rubs (DAR) without reaching the underlying substrate.

The baked panel was also tested for the presence of filiform corrosion according to the Filiform Corrosion Test Method. Filiform corrosion was present in the form of filaments measuring 1 mm.

The baked panel was also evaluated for hydrolytic stability according to the Hydrolytic Stability Test Method. The film was determined to possess hydrolytic stability as measured according to the Hydrolytic Stability Test Method because the coating survived 100 double acetone rubs without exposing the underlying substrate.

Example 6—Preparation of Aqueous Resinous Dispersion of a Phosphated Epoxy Resin

Example 6A

A general procedure for making a phosphated epoxy resin by phosphating before incorporating carbamate groups was performed as follows:

| Charge # | Material | Amount (g) |
|---|---|---|
| 1 | Bisphenol-A Diglycidyl Ether | 245.9 |
| 2 | Bisphenol-A | 79.2 |
| 3 | Butyl carbitol formal | 10.1 |
| 4 | Ethyltriphenylphosphonium Bromide | 0.2 |
| 5 | Methyl isobutyl ketone | 47.3 |
| 6 | Ektasolve EEH | 107.3 |
| 7 | Butyl CELLOSOLVE | 83.7 |
| 8 | 2-Ethyl-1-hexanol | 68.7 |
| 9 | 85% Phosphoric Acid | 13.8 |
| 10 | Phenylphosphonic Acid | 15.0 |
| 11 | Ektasolve EEH | 26.0 |
| 12 | Deionized water | 32.2 |
| 13 | Dibutyltindilaurate | 0.5 |
| 14 | Carbamate-functional molecule of Example 4 | 143.9 |
| 15 | Diisopropanolamine | 51.5 |
| 16 | Cymel 1130 | 169.4 |
| 17 | Deionized water | 183.6 |
| 18 | Deionized water | 509.6 |

Charges 1-4 were added to a flask set up for total reflux with stirring under nitrogen and heated to 130° C. and allowed to exotherm to 160° C. The mixture was held at 160° C. for 1 hour. After 1 hour, charges 5-8 were added while cooling to 90° C. When 90° C. was reached, charges 9-11 were added. The mixture was allowed to exotherm and the temperature was adjusted to 120° C. The mixture was held at that temperature for 30 minutes, then cooled to 100° C. When 100° C. was reached, charge 12 was added slowly and the mixture was held at 100° C. for 1 hour, then cooled to 80° C. Charge 13 was added followed by charge 14 over 1 hour. After 1 hour, residual NCO was checked by IR and none remained. The mixture was then warmed to 90° C. Charge 15 was added followed by charge 16. The mixture was stirred for 30 minutes as the temperature was readjusted to 90° C. The resulting mixture was then reverse thinned into charge 17, which was at ambient temperature, and held for 30 minutes. Charge 18 was then added and held for 30 minutes. Final solids were 38.0%. Final molecular weight as determined by GPC (Mz) was 247,561.

The phosphated epoxy resin was also tested by electrospray ionization mass spectrometry to determine whether the carbamate-functional molecule of Example 4 was present on the phosphated epoxy resin. The mass difference of the carbamate-functional molecule of Example 4 (341 Da) was not found in the phosphated epoxy resin after attempted reaction with the carbamate-functional molecule of Example 4. These results indicated that the carbamate-functional molecule of Example 4 was likely not reacted onto the phosphated epoxy resin, and, accordingly, that the phosphated epoxy polymer did not include carbamate functional groups.

Example 6B

The aqueous resinous dispersion of Example 6A was formulated into a paint using the following procedure:

| Charge # | Material | Amount (g) |
|---|---|---|
| 1 | Aqueous Resinous Dispersion of Example 6A | 1158.0 |
| 2 | ACPP2220 | 239.0 |
| 3 | Deionized water | 1403.0 |

Charge 1 was added to a 1-gallon plastic bucket and agitation was started. Charge 2 was added slowly over 5 minutes. Finally, charge 3 was added over 5 minutes and the resulting mixture stirred for an additional 15 minutes.

After ultrafiltration, the paint was electrodeposited (60V/60s/75° F.) onto 2024 T3 aluminum panel with the aluminum panel serving as the anode and baked in an oven set to a temperature of 250° F. for 60 minutes.

The baked substrate was tested for cure according to the Double Acetone Rub Test Method. The coating of Example 6B passed the Double Acetone Rub Test Method by surviving 100 double acetone rubs (DAR) without reaching the underlying substrate.

The baked panel was also evaluated for hydrolytic stability according to the Hydrolytic Stability Test Method. The film was determined to lack hydrolytic stability as measured according to the Hydrolytic Stability Test Method because the rubbing wore through the coating to expose the underlying substrate after 53 double acetone rubs.

Example 7—Preparation of an Aqueous Resinous Dispersion of a Carbamate-Functional Phosphated Epoxy Resin and Carbamate-Functional Oligomer

Example 7A

A general procedure for making an aqueous resinous dispersion of a carbamate-functional phosphated epoxy resin and the carbamate-functional oligomer of Example 2 was performed as follows:

| Charge # | Material | Amount (g) |
|---|---|---|
| 1 | Bisphenol-A Diglycidyl Ether | 196.7 |
| 2 | Bisphenol-A | 63.3 |
| 3 | Butyl carbitol formal | 8.0 |
| 4 | Ethyltriphenylphosphonium Bromide | 0.2 |
| 5 | Methyl isobutyl ketone | 37.8 |
| 6 | Dibutyltindilaurate | 0.4 |
| 7 | Carbamate-functional molecule of Example 4 | 120.2 |
| 8 | Ektasolve EEH | 85.9 |
| 9 | Butyl CELLOSOLVE | 67.0 |
| 10 | 2-Ethyl-1-hexanol | 55.0 |
| 11 | 85% Phosphoric Acid | 11.0 |
| 12 | Phenylphosphonic Acid | 12.0 |
| 13 | Ektasolve EEH | 20.8 |
| 14 | Deionized water | 25.8 |
| 15 | Diisopropanolamine | 41.2 |
| 16 | Cymel 1130 | 188.0 |
| 17 | Carbamate-functional oligomer of Example 2 | 178.7 |
| 18 | Deionized water | 294.6 |
| 19 | Deionized water | 565.8 |

Charges 1-4 were added to a flask set up for total reflux with stirring under nitrogen and heated to 130° C. and allowed to exotherm to 160° C. The mixture was held at 160° C. for 1 hour. After 1 hour, charge 5 was added while cooling to 80° C. When 80° C. was reached, charge 6 was added followed by charge 7 over 1 hour. After 1 hour, residual NCO was checked by IR and none remained. The mixture was then warmed to 90° C. When 90° C. was reached, charges 8-10 were added followed by charges 11-13. The mixture was allowed to exotherm and the temperature was adjusted to 120° C. The mixture was held at that temperature for 30 minutes, then cooled to 100° C. Charge 14 was added slowly and the mixture was held at 100° C. for 1 hour, then cooled to 90° C. Charge 15 was added followed by charge 16, then charge 17. The mixture was stirred for 30 minutes as the temperature was readjusted to 90° C. The resulting mixture was then reverse thinned into charge 18, which was at ambient temperature, and held for 30 minutes. Charge 19 was then added and held for 30 minutes. Final solids were 34.5%. Final molecular weight as determined by GPC (Mz) was 89,973.

The carbamate-functional epoxy polymer containing phosphoric and phosphonic acid with a low molecular weight carbamate was formulated into a paint using the following procedure:

| Charge # | Material | Amount (g) |
|---|---|---|
| 1 | Aqueous resinous dispersion of Example 7A | 1273.0 |
| 2 | ACPP2220 | 239.1 |
| 3 | Deionized water | 1288.6 |

Charge 1 was added to a 1-gallon plastic bucket and agitation was started. Charge 2 was added slowly over 5 minutes. Finally, charge 3 was added over 5 minutes and the resulting mixture stirred for an additional 15 minutes.

After ultrafiltration, the paint was electrodeposited (80V/90s/75° F.) onto 2024 T3 aluminum panel with the aluminum panel serving as the anode and baked in an oven set to a temperature of 250° F. for 60 minutes.

The baked substrate was tested for cure according to the Double Acetone Rub Test Method. The coating of Example 7B passed the Double Acetone Rub Test Method by surviving 100 double acetone rubs (DAR) without reaching the underlying substrate.

The baked panel was also tested for the presence of filiform corrosion according to the Filiform Corrosion Test Method. Filiform corrosion was not detected because no filaments were found along the scribed area.

TABLE 1

Summary of Cure and Hydrolytic Stability Performance

| Ex # | Polymer Functionality | Cure | Hydrolytic Stability |
|---|---|---|---|
| 1B | Hydroxyl | Pass | Fail |
| 5B | Carbamate (carbamate groups added before phosphating) | Pass | Pass |
| 6B | Hydroxyl (attempt to add carbamate groups after phosphating was not successful)[1] | Pass | Fail |

[1]As discussed above, although a reaction was attempted to add carbamate functional groups onto the resin backbone after the resin was phosphated, carbamate functional groups were not detected on the resin when tested by electrospray ionization mass spectrometry. Since the reaction was not successful, the hydroxyl functional groups were not substituted by carbamate functional groups, and the polymer functionality would have been hydroxyl.

As shown in Table 1, both the hydroxyl functional phosphated epoxy resin and the carbamate functional phosphated epoxy resin achieve passing cure performance when baked at 250° F. for 60 minutes with an alkoxylated melamine curing agent. However, the film resulting from the hydroxyl functional phosphated epoxy resin did not retain its film integrity after hydrolytic stability testing. Without intending to be bound by any theory, it is believed that the instability of the cured film is due to the hydrolytically unstable nature of the hydroxyl-melamine bond.

In contrast, the film resulting from the carbamate-functional phosphated epoxy resin retained its film integrity after hydrolytic stability testing. The stability of the film indicates that the carbamate-melamine bond is hydrolytically stable and resistant to hydrolytic attack. The stability of the film resulting from the carbamate-functional phosphated epoxy resin was a surprising result.

TABLE 2

Filiform Corrosion Performance Summary

| Ex # | Polymer Functionality | Carbamate-functional oligomer | Size of Filaments (mm) |
|---|---|---|---|
| 1B | Hydroxyl | — | 1 |
| 3B | Hydroxyl | Hydroxypropylcarbamate fully-capped hexamethylene diisocyanate trimer | 0 |
| 5B | Carbamate | — | 1 |
| 7B | Carbamate | Hydroxypropylcarbamate fully-capped hexamethylene diisocyanate trimer | 0 |

Addition of a hydroxypropylcarbamate fully-capped hexamethylene diisocyanate trimer to either a hydroxyl and/or carbamate-functional polymer system made an improvement to filiform corrosion resistance as indicated by the presence of no measurable filaments compared to corresponding systems that do not contain the carbamate-functional oligomer as indicated by the presence of filaments.

It will be appreciated by skilled artisans that numerous modifications and variations are possible in light of the above disclosure without departing from the broad inventive concepts described and exemplified herein. Accordingly, it is therefore to be understood that the foregoing disclosure is merely illustrative of various exemplary aspects of this application and that numerous modifications and variations can be readily made by skilled artisans which are within the spirit and scope of this application and the accompanying claims.

We claim:
1. A phosphated epoxy resin comprising:
   at least one terminal group comprising a phosphorous atom covalently bonded to the resin by a carbon-phosphorous bond or by a phosphoester linkage; and
   at least one carbamate functional group;
   wherein the terminal group of the phosphated epoxy resin comprises the structure:

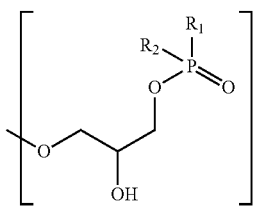

wherein $R_1$ and $R_2$ each independently represent hydrogen, hydroxyl, an alkyl radical, an aryl radical, or a phosphoester group, and
   wherein the phosphated epoxy resin comprises at least one constitutional unit A comprising the structure:

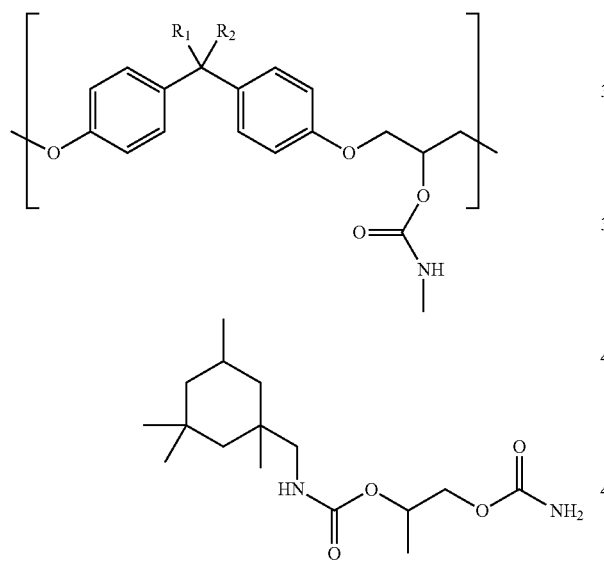

wherein $R_1$ and $R_2$ each independently represent hydrogen, an alkyl radical or an aryl radical.

2. The phosphated epoxy resin of claim 1, wherein the phosphated epoxy resin further comprises at least one constitutional unit B comprising the structure:

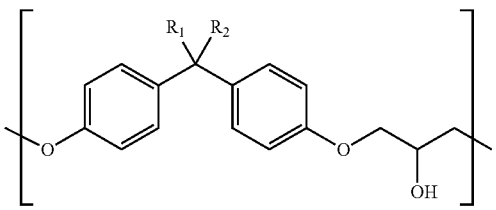

wherein $R_1$ and $R_2$ each independently represent hydrogen, an alkyl radical or an aryl radical.

3. The phosphated epoxy resin of claim 2, wherein the ratio of constitutional unit A to constitutional unit B is from 1:20 to 20:1.

4. A method of making the phosphated epoxy resin of claim 1, the method comprising:
   reacting an epoxy resin comprising at least one terminal epoxide functional group and at least one pendant hydroxyl functional group with a molecule comprising an isocyanato functional group and a carbamate functional group, wherein the pendant hydroxyl functional group and isocyanato functional group react to form a urethane linkage, whereby the molecule is incorporated into the epoxy resin to form a carbamate-functional epoxy resin; and
   further reacting the carbamate-functional epoxy resin with a phosphoric acid, a phosphonic acid, a phosphinic acid, or combinations thereof, wherein the at least one terminal epoxide functional group of the carbamate-functional epoxy resin reacts with an acid group of the phosphoric acid or phosphonic acid, whereby the phosphoric acid and/or the phosphonic acid is incorporated into the carbamate-functional epoxy resin to form the phosphated epoxy resin comprising at least one carbamate functional group.

5. The method of claim 4, wherein the phosphated epoxy resin comprising at least one carbamate functional group is neutralized with a base.

6. An aqueous resinous dispersion comprising:
   (a) the phosphated epoxy resin of claim 1; and
   (b) a carbamate-functional oligomer comprising at least two carbamate functional groups.

7. An aqueous resinous dispersion comprising:
   (a) a phosphated epoxy resin comprising:
      (i) at least one terminal group comprising a phosphorous atom covalently bonded to the resin by a carbon-phosphorous bond or by a phosphoester linkage; and
      (ii) at least one carbamate functional group; and
   (b) a curing agent;
   wherein the terminal group of the phosphated epoxy resin comprises the structure:

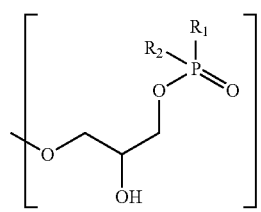

wherein $R_1$ and $R_2$ each independently represent hydrogen, hydroxyl, an alkyl radical, an aryl radical, or a phosphoester group, and wherein the phosphated epoxy resin comprises at least one constitutional unit A comprising the structure:

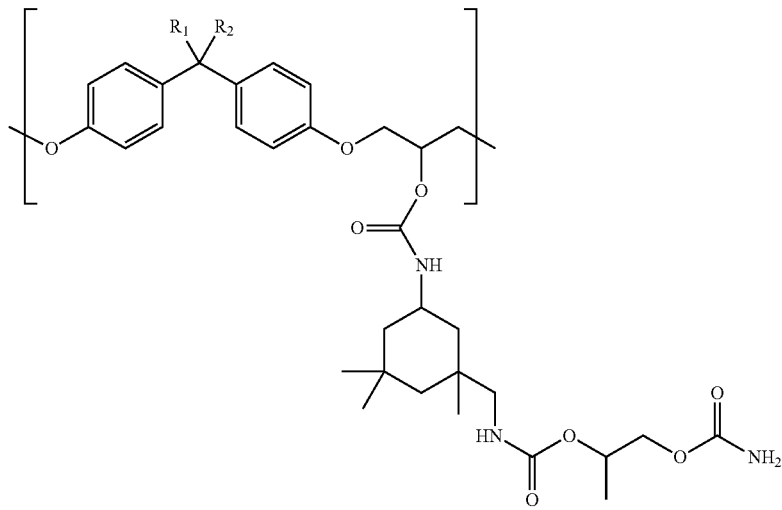

wherein $R_1$ and $R_2$ each independently represent hydrogen, an alkyl radical or an aryl radical.

8. The aqueous resinous dispersion of claim 7, wherein the terminal group comprises phosphate, organophosphate, phosphonate, organophosphonate, phosphinate, organophosphinate, or combinations thereof.

9. The aqueous resinous dispersion of claim 7, wherein the phosphated epoxy resin comprises the structure:

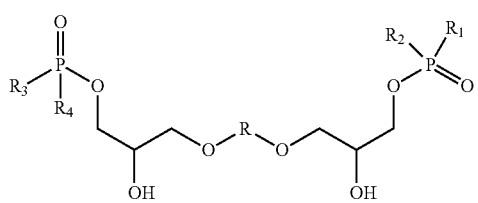

wherein $R_1$, $R_2$, $R_3$ and $R_4$ each independently represent hydrogen, hydroxyl, an alkyl radical, an aryl radical, or a phosphoester group, and R represents the residue of an epoxy functional polymer comprising at least one carbamate functional group.

10. The aqueous resinous dispersion of claim 7, wherein the phosphated epoxy resin is substantially free of pendent groups comprising a phosphorous atom covalently bonded to the resin by a carbon-phosphorous bond or by a phosphoester linkage.

11. The aqueous resinous dispersion of claim 7, wherein the phosphated epoxy resin comprises at least one pendent group comprising the carbamate functional group, the pendent group comprising the structure:

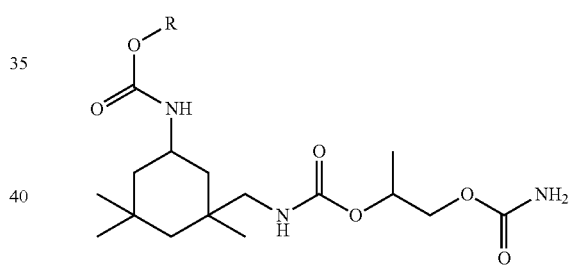

wherein R represents remainder of the phosphated epoxy resin.

12. The aqueous resinous dispersion of claim 7, wherein the phosphated epoxy resin further comprises at least one constitutional unit B comprising the structure:

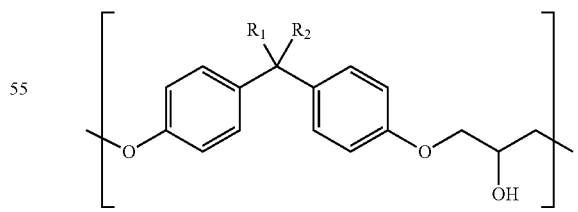

wherein $R_1$ and $R_2$ each independently represent hydrogen, an alkyl radical or an aryl radical.

13. The aqueous resinous dispersion of claim 12, wherein the ratio of constitutional unit A to constitutional unit B is from 1:20 to 20:1.

14. The aqueous resinous dispersion of claim 7, wherein the phosphated epoxy resin comprises the structure:

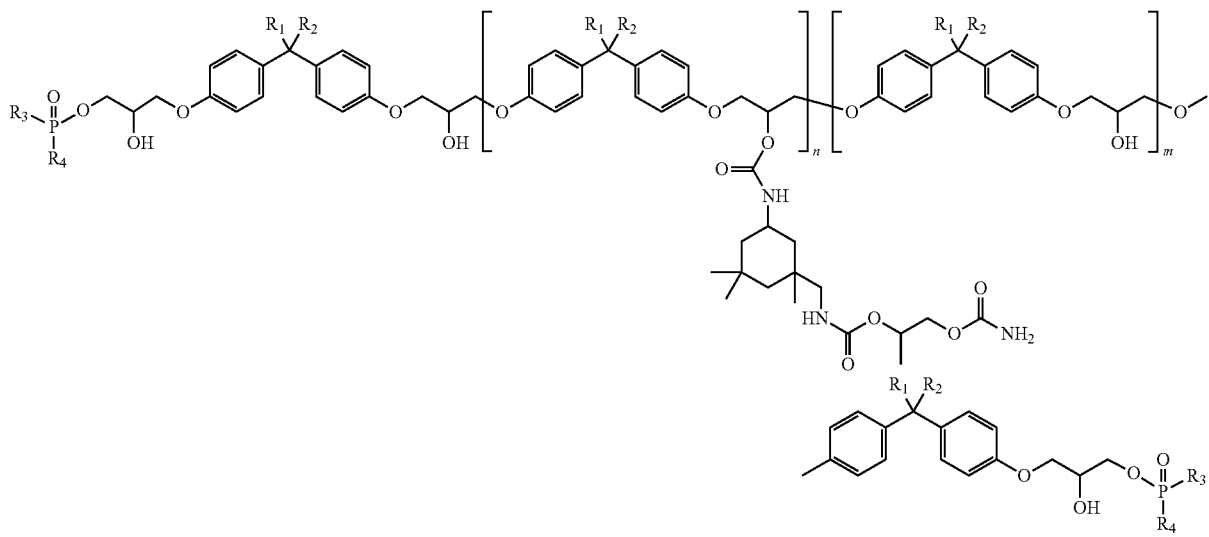

wherein m is 1 to 2,000 and n is 0 to 2,000; $R_1$ and $R_2$ each independently represent hydrogen, an alkyl radical or an aryl radical; $R_3$ and $R_4$ each independently represent hydrogen, hydroxyl, an alkyl radical, an aryl radical, or a phosphoester group.

15. The aqueous resinous dispersion of claim 7, wherein the curing agent comprises at least two functional groups reactive with carbamate functional groups.

16. The aqueous resinous dispersion of claim 7, wherein the curing agent comprises an aminoplast resin, a phenoplast resin, a blocked polyisocyanate, or combinations thereof.

17. The aqueous resinous dispersion of claim 7, wherein the aqueous resinous dispersion is substantially free of metal-containing catalysts.

18. The aqueous resinous dispersion of claim 7, further comprising a carbamate-functional oligomer comprising at least two carbamate functional groups.

19. The aqueous resinous dispersion of claim 18, wherein the carbamate-functional oligomer comprises the structure:

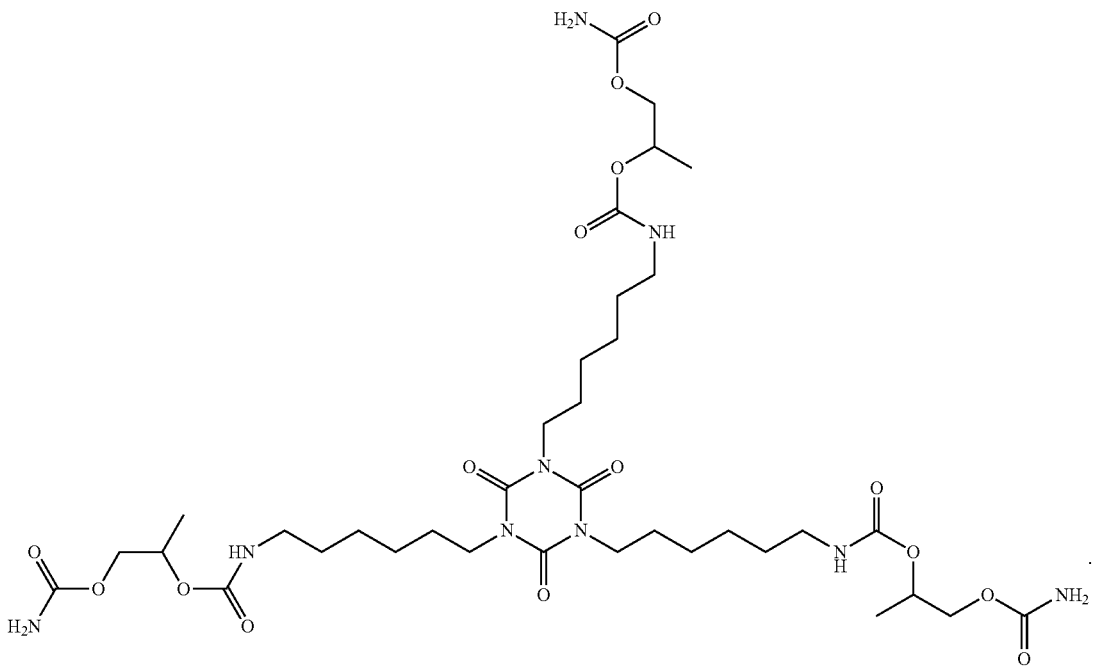 [SMILES: CC(COC(N)=O)OC(=O)NCCCCCCn1c(=O)n(CCCCCCNC(=O)OC(C)COC(N)=O)c(=O)n(CCCCCCNC(=O)OC(C)COC(N)=O)c1=O]

20. A method of coating a substrate comprising electrophoretically depositing the aqueous resinous dispersion of claim 7 onto the substrate to form a coating on the substrate.

21. The method of claim 20, wherein the coating deposited from the aqueous resinous dispersion of claim 7 cures at a bake temperature of 250° F. in 60 minutes or less, as measured by surviving at least 25 double acetone rubs according to Double Acetone Rub Test Method.

22. The method of claim 20, wherein the coating deposited from the aqueous resinous dispersion of claim 7 is hydrolytically stable, as determined by the Hydrolytic Stability Test Method.

23. The method of claim 20, wherein the aqueous resinous dispersion further comprises a carbamate-functional oligomer, and the coating deposited from the aqueous resinous dispersion demonstrates a decreased length of filiform corrosion when compared to a comparative coating composition that does not include the carbamate-functional oligomer, as measured according to the Filiform Corrosion Test Method.

24. A coated substrate, wherein the coated substrate is at least partially coated with the aqueous resinous dispersion of claim 7.

25. A part at least partially coated with the aqueous resinous dispersion of claim 7.

26. A vehicle comprising the part of claim 25.

27. The vehicle of claim 26, wherein the vehicle comprises an aerospace vehicle.

28. A vehicle at least partially coated with the aqueous resinous dispersion of claim 7.

29. The vehicle of claim 28, wherein the vehicle comprises an aerospace vehicle.

* * * * *